(12) United States Patent
Hedlund et al.

(10) Patent No.: US 9,540,072 B2
(45) Date of Patent: Jan. 10, 2017

(54) SNOWMOBILE

(71) Applicant: Polaris Industries Inc., Medina, MN (US)

(72) Inventors: Michael A. Hedlund, Roseau, MN (US); Michael L. Fugleberg, Wyoming, MN (US); Matthew J. Prusak, Salol, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 14/812,998

(22) Filed: Jul. 29, 2015

(65) Prior Publication Data

US 2015/0329177 A1   Nov. 19, 2015

Related U.S. Application Data

(62) Division of application No. 13/763,282, filed on Feb. 8, 2013, now Pat. No. 9,096,289.

(60) Provisional application No. 61/597,104, filed on Feb. 9, 2012.

(51) Int. Cl.
*B62M 27/02* (2006.01)
*B62D 55/104* (2006.01)

(52) U.S. Cl.
CPC ............ *B62M 27/02* (2013.01); *B62D 55/104* (2013.01); *B62M 2027/023* (2013.01); *B62M 2027/026* (2013.01); *B62M 2027/028* (2013.01)

(58) Field of Classification Search
CPC ............ B62M 27/02; B62M 2027/023; B62M 2027/026; B62M 2027/028; B62D 55/104

USPC ... 156/458; 29/156, 293; 403/312, 265, 268, 403/292
See application file for complete search history.

(56) References Cited

U.S. PATENT DOCUMENTS

| 2,834,608 | A | * | 5/1958 | Wixson | ................... B60G 7/04 16/19 |
|---|---|---|---|---|---|
| RE26,775 | E | | 1/1970 | Smieja | |
| 3,688,856 | A | | 9/1972 | Boehm et al. | |
| 3,712,416 | A | | 1/1973 | Swanson et al. | |

(Continued)

FOREIGN PATENT DOCUMENTS

| CA | 1150752 | 7/1983 |
|---|---|---|
| CA | 2561337 A1 | 9/1999 |

(Continued)

OTHER PUBLICATIONS

International Search Report and Written Opinion, issued by the European Patent Office, for International Application No. PCT/US2013/025354, mailed Sep. 18, 2014, 13 pages.

(Continued)

*Primary Examiner* — Jacob Knutson
(74) *Attorney, Agent, or Firm* — Faegre Baker Daniels LLP

(57) ABSTRACT

A snowmobile includes a chassis comprising a bulkhead and a tunnel, a front suspension coupled to bulkhead, a rear suspension coupled to the tunnel, and slide rails coupled to the rear suspension. The rear suspension includes a toggle link pivotally coupled to the tunnel at a first pivot coupling, and a rear control arm coupled between the slide rails and the toggle link. The toggle link is pivotally coupled to the rear control arm at a second pivot coupling. The rear suspension also includes a carrier roller coupled to the toggle link. The toggle link is movable to a plurality of positions relative to the toggle link to vary the dynamics of the vehicle propulsion.

21 Claims, 22 Drawing Sheets

(56) References Cited

U.S. PATENT DOCUMENTS

| | | | |
|---|---|---|---|
| 3,840,082 A | 10/1974 | Olson | |
| 3,933,213 A | 1/1976 | Trowbridge | |
| 3,969,895 A | 7/1976 | Krizman | |
| RE28,922 E | 8/1976 | Lloyd, III | |
| 3,977,493 A | 8/1976 | Richardson | |
| 4,222,453 A | 9/1980 | Fixsen et al. | |
| 4,339,156 A * | 7/1982 | Livesay | B62D 55/14 305/125 |
| 4,407,386 A | 10/1983 | Yasui et al. | |
| 4,442,913 A | 4/1984 | Grinde | |
| 4,858,722 A | 8/1989 | Abbe et al. | |
| 4,917,207 A | 4/1990 | Yasui et al. | |
| 4,987,965 A | 1/1991 | Bourret | |
| 5,060,745 A | 10/1991 | Yasui et al. | |
| 5,370,198 A | 12/1994 | Karpik | |
| 5,692,759 A | 12/1997 | Flynn | |
| 5,697,332 A | 12/1997 | Asai et al. | |
| 5,727,643 A | 3/1998 | Kawano et al. | |
| 5,860,486 A | 1/1999 | Boivin et al. | |
| 5,947,217 A | 9/1999 | Snare et al. | |
| 6,161,908 A | 12/2000 | Takayama et al. | |
| 6,227,323 B1 | 5/2001 | Ashida | |
| 6,321,864 B1 | 11/2001 | Forbes | |
| 6,343,578 B1 | 2/2002 | Kerkau | |
| 6,379,411 B1 | 4/2002 | Turner | |
| 6,390,219 B1 | 5/2002 | Vaisanen | |
| 6,461,208 B2 | 10/2002 | Suzuki | |
| 6,551,385 B2 | 4/2003 | Turner | |
| 6,554,665 B1 | 4/2003 | Kaneko | |
| RE38,124 E | 5/2003 | Mallette et al. | |
| 6,557,530 B1 | 5/2003 | Benson | |
| 6,568,030 B1 * | 5/2003 | Watanabe | B60B 33/045 16/19 |
| 6,595,309 B1 | 7/2003 | Savage et al. | |
| 6,626,258 B1 | 9/2003 | Forbes | |
| 6,695,083 B2 | 2/2004 | Nakamura et al. | |
| 6,755,271 B1 | 6/2004 | Berg | |
| 6,823,834 B2 | 11/2004 | Benson | |
| 6,926,108 B1 | 8/2005 | Polakowski et al. | |
| 6,942,050 B1 | 9/2005 | Honkala et al. | |
| 7,040,437 B1 | 5/2006 | Fredrickson et al. | |
| 7,047,924 B1 | 5/2006 | Waters | |
| 7,063,057 B1 | 6/2006 | Waters | |
| 7,182,165 B1 | 2/2007 | Keinath et al. | |
| 7,237,803 B2 * | 7/2007 | Nguyen | B60P 3/36 280/727 |
| 7,444,236 B2 | 10/2008 | Wiles | |
| 7,455,141 B2 | 11/2008 | Hildebrand | |
| 7,761,217 B2 | 7/2010 | Waters | |
| 8,602,159 B2 | 12/2013 | Harris et al. | |
| 8,893,835 B2 | 11/2014 | Nam et al. | |
| 2003/0172907 A1 | 9/2003 | Nytomt | |
| 2004/0089492 A1 | 5/2004 | Eide | |
| 2004/0187826 A1 | 9/2004 | Kino | |
| 2004/0262064 A1 | 12/2004 | Lefort | |
| 2005/0199432 A1 | 9/2005 | Abe et al. | |
| 2005/0199433 A1 | 9/2005 | Abe et al. | |
| 2005/0205320 A1 | 9/2005 | Girouard et al. | |
| 2005/0225067 A1 * | 10/2005 | Nguyen | B60P 3/36 280/767 |
| 2005/0252592 A1 * | 11/2005 | Albright | B62D 55/12 152/379.3 |
| 2005/0279552 A1 | 12/2005 | Schuehmacher et al. | |
| 2006/0085966 A1 | 4/2006 | Kerner et al. | |
| 2006/0180370 A1 | 8/2006 | Polakowski et al. | |
| 2007/0017480 A1 | 1/2007 | Kondo | |
| 2007/0028877 A1 | 2/2007 | McDonald | |
| 2007/0199753 A1 | 8/2007 | Giese et al. | |
| 2007/0227810 A1 | 10/2007 | Sakurai | |
| 2007/0246283 A1 | 10/2007 | Giese et al. | |
| 2008/0141957 A1 | 6/2008 | Dea | |
| 2009/0217908 A1 | 9/2009 | Watanabe | |
| 2009/0294197 A1 | 12/2009 | Polakowski et al. | |
| 2010/0071982 A1 * | 3/2010 | Giese | B62M 27/02 180/193 |
| 2010/0089355 A1 | 4/2010 | Fredrickson et al. | |
| 2010/0108427 A1 | 5/2010 | Richer | |
| 2010/0269771 A1 | 10/2010 | Wermuth | |
| 2011/0100340 A1 | 5/2011 | Mukkala | |
| 2011/0139529 A1 * | 6/2011 | Eichenberger | B60K 28/00 180/190 |
| 2012/0143465 A1 | 6/2012 | Kim | |
| 2012/0205902 A1 | 8/2012 | Beavis et al. | |
| 2013/0233265 A1 | 9/2013 | Zurface | |

FOREIGN PATENT DOCUMENTS

| | | | |
|---|---|---|---|
| EP | 0287038 | 10/1988 | |
| JP | HOI 113527 | 5/1989 | |
| JP | 2001065344 | 3/2001 | |
| WO | WO 95/01503 | 1/1995 | |
| WO | WO 01/05613 | 1/2001 | |
| WO | WO 02/087957 A | 11/2002 | |
| WO | WO 2007/100751 A2 | 9/2007 | |
| WO | WO 2009/114414 A1 | 9/2009 | |
| WO | WO 2009114414 A1 * | 9/2009 | B62J 25/00 |
| WO | WO 2011/093847 | 8/2011 | |
| WO | WO 2011/099959 | 8/2011 | |

OTHER PUBLICATIONS

International Preliminary Report on Patentability, issued by the European Patent Office, for International Application No. PCT/US2013/025354, mailed Jun. 4, 2014, 10 pages.

International Search Report and Written Opinion, issued by the European Patent Office, dated Nov. 6, 2007 for International Application No. PCT/US2007/004895; 20 pages.

International Preliminary Report on Patentability, issued by the European Patent Office, Jun. 10, 2008, for International Application No. PCT/US2007/004895; 22 pages.

International Search Report and Written Opinion, issued by the European Patent Office, mailed Jul. 2, 2010, for International Application No. PCT/US2009/066093; 14 pages.

Annex to Form PCT/ISA/206 Communication Relating to the Results of the Partial International Search issued by the European Patent Office, mailed Mar. 2, 2010, Rijswijk, Netherlands, for a related international PCT Application No. PCT/US2009/066093; 3 pages.

International Preliminary Report on Patentability, issued by the International Bureau of WIPO, Geneva, Switzerland, dated Jul. 19, 2011, for International Application No. PCT/US2009/066093; 9 pages.

International Search Report and Written Opinion issued by the European Patent Office for PCT/US2015/010623, mailed Mar. 24, 2015; 11 pages.

International Search Report and Written Opinion issued by the European Patent Office for PCT/US2015/010621, mailed Aug. 12, 2014; 17 pages.

* cited by examiner

SNOWMOBILE

CROSS-REFERENCE TO RELATED APPLICATIONS

The present application is a divisional of U.S. patent application Ser. No. 13/763,282, filed on Feb. 8, 2013, and entitled "SNOWMOBILE", which claims priority to U.S. Provisional Patent Application Ser. No. 61/597,104, filed on Feb. 9, 2012, the complete disclosures of which are expressly incorporated by reference herein.

BACKGROUND

The present application relates to a snowmobile.

The present invention relates to snowmobiles, and more particularly, the present invention relates generally to a frame assembly and suspension assembly for snowmobiles. The present application claims priority to U.S. Provisional Patent Application Ser. No. 61/597,104, filed on Feb. 9, 2012, the subject matter of which is expressly incorporated by reference herein.

Performance characteristics of snowmobiles, including the comfort of the ride, depend on a variety of systems and components, including the snowmobile suspension. Typically, a snowmobile suspension includes two systems, a front suspension system for a pair of skis and a rear suspension system for the track.

The rear suspension of a snowmobile supports an endless track driven by the snowmobile engine to propel the machine. The track is supported beneath a vehicle chassis by a suspension that is designed to provide a comfortable ride and to help absorb the shock of the snowmobile crossing uneven terrain. Most modern snowmobiles use a slide rail suspension which incorporates a pair of slide rails along with several idler wheels to support the track in its configuration. The slide rails are typically suspended beneath the chassis by a pair of suspension arms, with each arm being attached at its upper end to the chassis of the snowmobile, and at its lower end to the slide rails. The mechanical linkage of the slide rails to the suspension arms and to the snowmobile chassis typically is provided by springs and at least one element acting along a linear path, such as a shock absorber, damper, air shock, shock and spring combination, or other linear force element (LFE). The springs are loaded to bias the slide rails downwardly away from the snowmobile chassis and the shock absorbers; dampers or LFEs provide damping forces for ride comfort.

SUMMARY

In one aspect, a snowmobile comprises a chassis having a front chassis portion and a rear chassis portion. The front chassis portion includes a bulkhead and a steering mount positioned above the bulkhead by way of frame members. An engine has at least one intake and at least one exhaust port, and the engine is mounted with the at least one exhaust port facing forwardly. A steering post is coupled to the steering mount and extends substantially along a longitudinal centerline of the vehicle and over a top of the engine. An exhaust outlet is coupled to the at least one exhaust port, the exhaust outlet projecting vertically upwardly to a position higher than the engine, and projecting rearwardly between the steering post and one of the frame members.

In another aspect, a snowmobile comprises a chassis having a front chassis portion and a rear chassis portion, the front chassis portion includes a bulkhead. An engine is supported by the chassis. A steering post extends substantially along a longitudinal centerline of the vehicle and extends over a top of the engine and is coupled to the bulkhead. The snowmobile includes front steerable skis; spindles coupled to the skis; steering arms coupled to the spindles; and a first coupling link interconnecting the steering arms and the steering post, the first coupling link being an extruded member forming plural pivot points.

In another aspect, a snowmobile comprises a chassis extending along a longitudinal axis; and an engine supported by the bulkhead. The engine has a crankshaft having a crankshaft axis transverse to the longitudinal axis. The engine has a piston coupled to the crankshaft and reciprocates along a piston reciprocation axis, the piston reciprocation axis extending upwardly and forwardly. A continuously variable clutch has a drive clutch coupled coaxially to the crankshaft and a driven clutch mounted rearwardly of the drive clutch, wherein a line between a rotational axis of the drive clutch and a rotational axis of the driven clutch define a clutch axis, and wherein an angle formed between the piston reciprocation axis and the clutch axis is approximately 90°.

In yet another aspect, a snowmobile comprises a chassis including a bulkhead and a tunnel, an engine supported by the chassis, a front suspension coupled to the bulkhead, a rear suspension coupled to the tunnel, a fuel tank supported by a tunnel top surface, and a frame comprising frame tubes extending downwardly and rearwardly and coupled to rear corners of the tunnel, with the frame tubes flanking the fuel tank.

In a further embodiment, a snowmobile comprises a chassis having a bulkhead and a tunnel. An engine is supported by the chassis and a front suspension is coupled to bulkhead. A rear suspension is coupled to the tunnel and slide rails are coupled to the rear suspension. The rear suspension comprises a toggle link pivotally coupled to the tunnel, and a rear control arm coupled between the slide rails and the toggle link. A front control arm is coupled between the slide rails and the tunnel; wherein the snowmobile has a snowmobile center of gravity, and the front control arm is mounted at a position in a range of 300-310 mm relative to the snowmobile center of gravity.

In yet another embodiment, a snowmobile, comprises a chassis, having a bulkhead and a tunnel. An engine is supported by the chassis, and a front suspension is coupled to bulkhead. A rear suspension is coupled to the tunnel. Slide rails are coupled to the rear suspension, where the rear suspension is comprised of a toggle link pivotally coupled to the tunnel, and a rear control arm coupled between the slide rails and the toggle link; a carrier roller coupled to the toggle link, the toggle link being movable to a plurality of positions relative to the toggle link to vary the dynamics of the vehicle propulsion; and a front control arm coupled between the slide rails and the tunnel.

DETAILED DESCRIPTION

Figure 1:
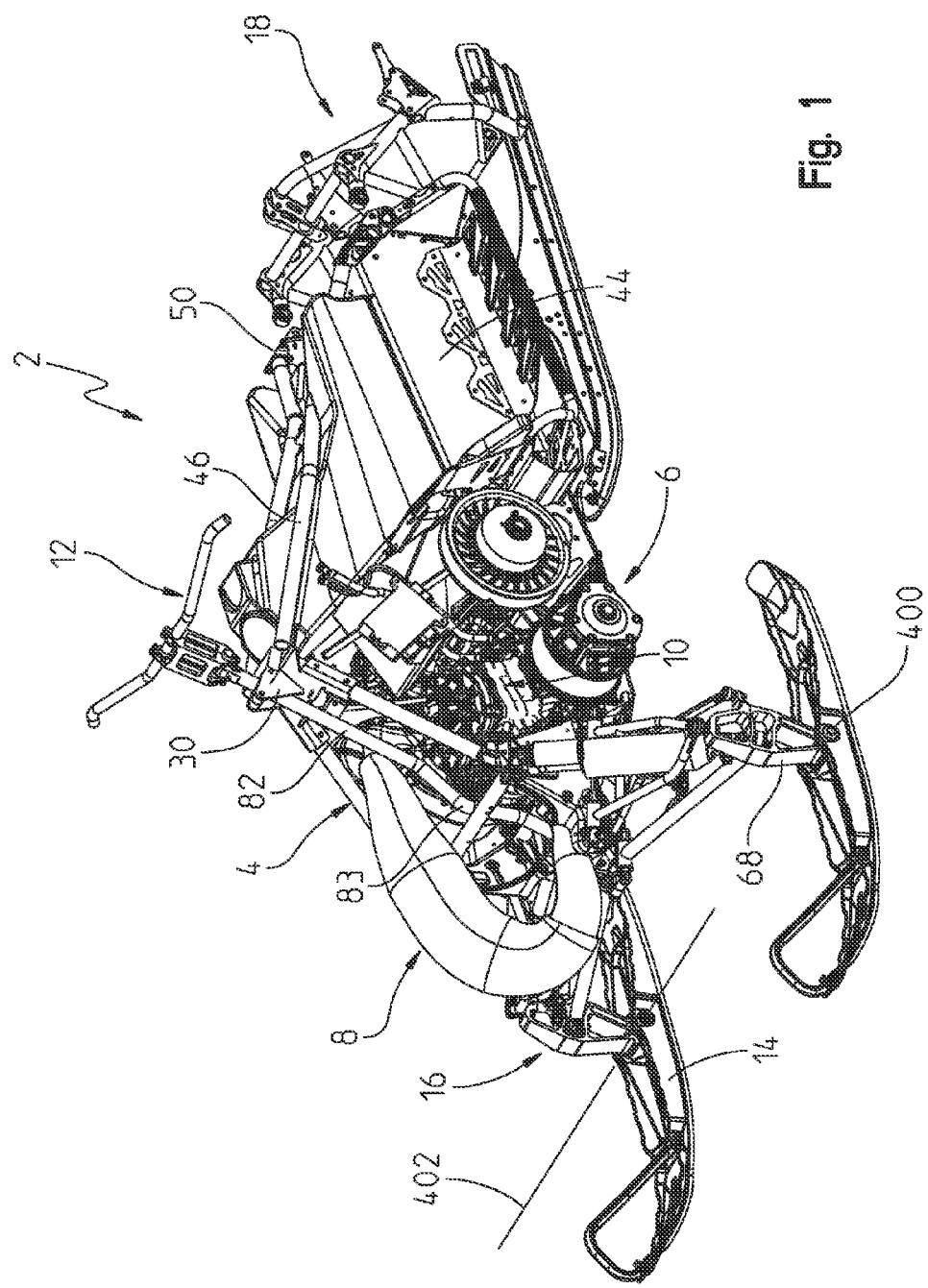
FIG. 1 shows a front perspective view of a snowmobile according to the present embodiment, shown without the body member and driver's seat.

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

With reference first to FIG. 1, a snowmobile is generally shown at 2 to include a frame 4, a propulsion system 6 coupled to the frame, an exhaust system 8 coupled to an engine 10 of the propulsion system 6, a steering system 12 coupled to steerable skis 14, and front 16 and rear 18 suspensions.

Figure 2:
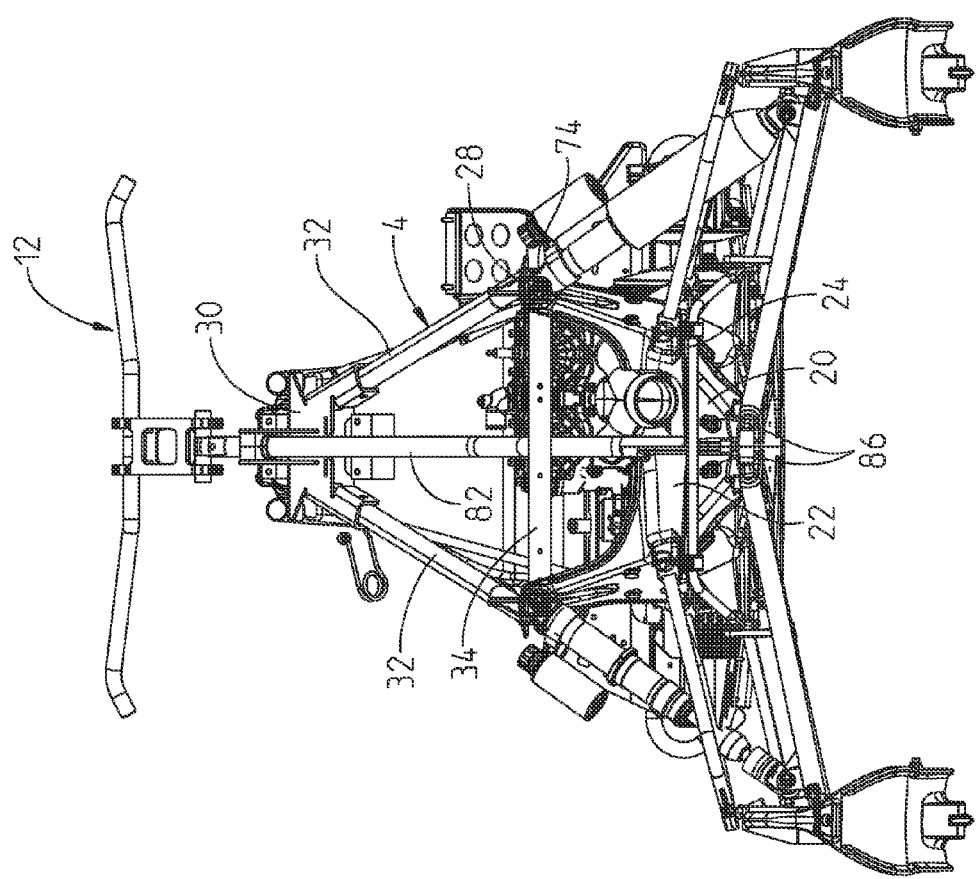
FIG. 2 is a front view of the snowmobile of FIG. 1 with the exhaust system removed.

With respect to FIG. 2, frame 4 will be described in greater detail. It should be understood that frame 4 is similar in nature to that described in Applicant's patent application Ser. No. 13/027,116, the subject matter of which is incorporated herein in its entirety. Frame 4 includes lower cast members 20, 22 which are fastened together in a clam shell type arrangement. Cast members 20 and 22 include integrated upper and lower pivot members 24, 26 (FIG. 3) and upper pedestals 28. A coupler 30 is provided which couples frame tubes 32 between coupler 30 and pedestal 28 of cast member 20. Cross tube 34 extends between the cast members 20 and 22. Frame tubes 32 could be fastened by any mechanical means such as by fasteners, welding, adhesives and the like.

Figure 3:
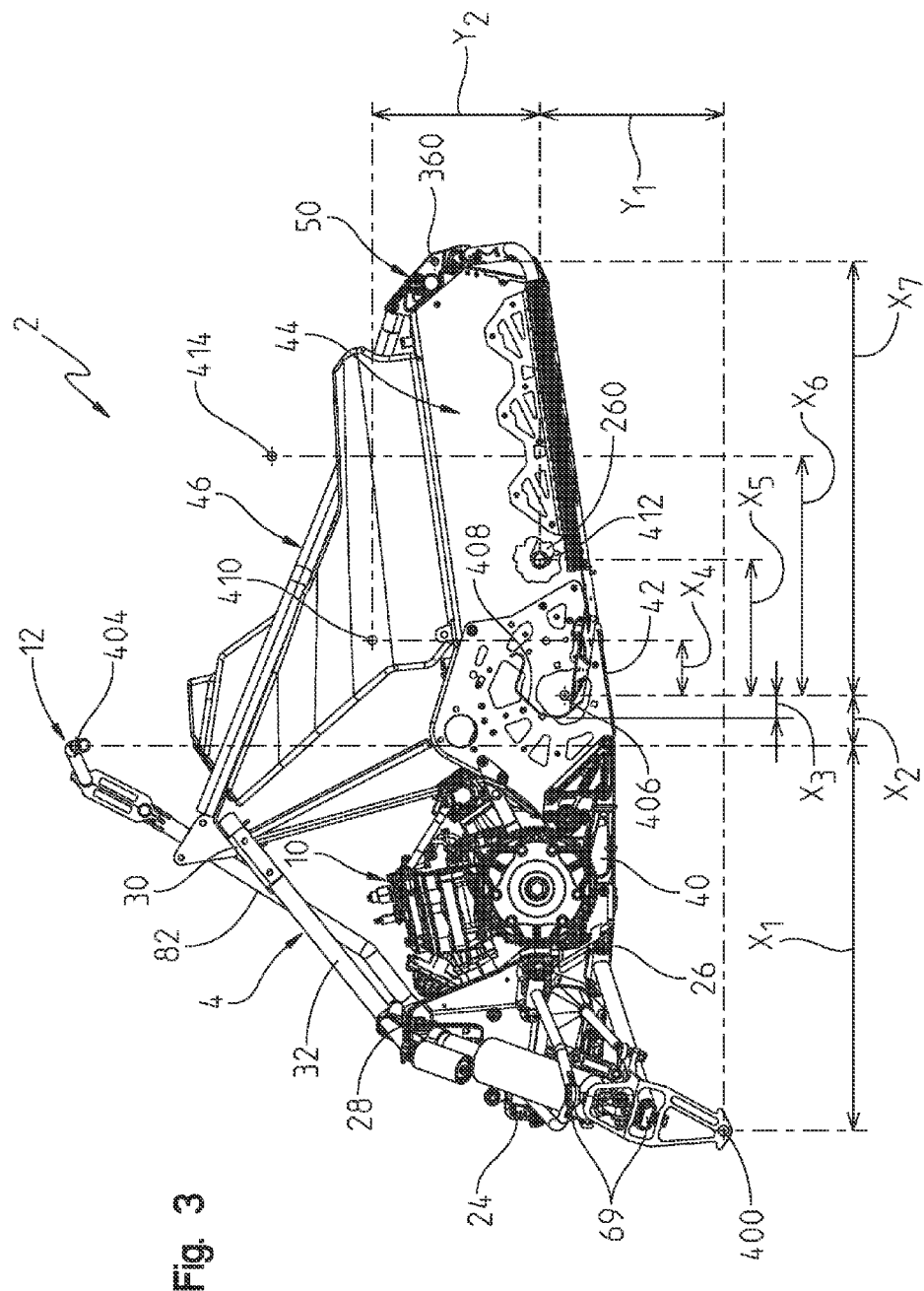
FIG. 3 is a side view of the snowmobile of FIG. 1.

With respect now to FIG. 3, frame 4 further includes engine cradle 40, drive housing 42, tunnel 44 and brace tubes 46 extending between coupler 30 and cast couplings 50 (FIG. 1) attached to tunnel 44.

Figure 4:
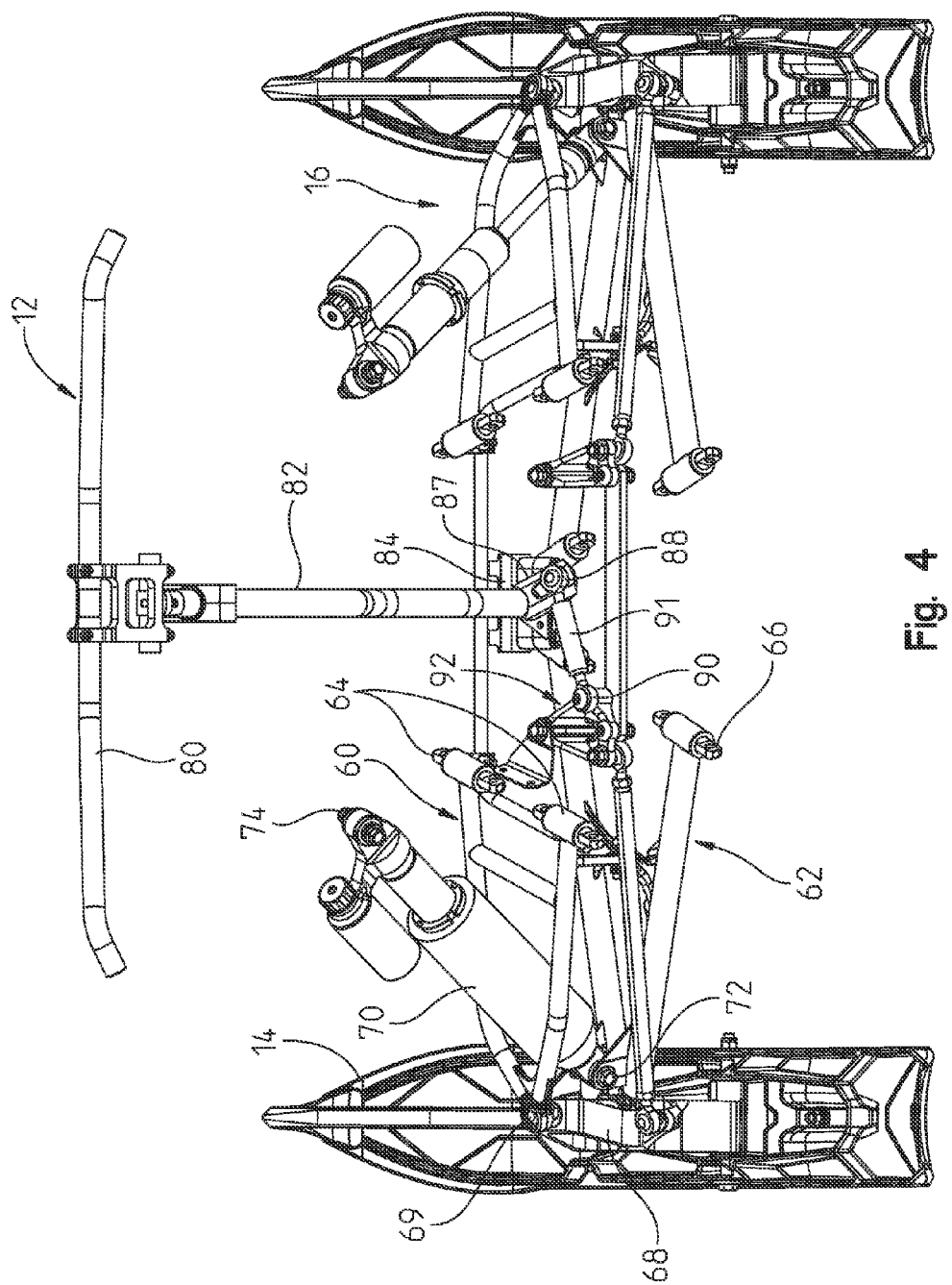
FIG. 4 is a rear perspective view of the steering system of the present embodiment.

With reference now to FIG. 4, suspension system 16 will be described in greater detail. Suspension 16 includes upper 60 and lower 62 alignment arms having pivot mounts 64 and 66 attachable to pivot members 24 (FIG. 2) and 26 (FIG. 3) where each of the alignment arms 60, 62 are attached to spindle 68 by way of ball joints 69 (FIGS. 3 and 4) as is known in the art. A shock absorber 70 is attached at 72 to lower alignment arm 62 and extends upwardly through upper alignment arm 60 and is attached at 74 to pedestal 28 (FIGS. 2 and 4).

Figure 5:
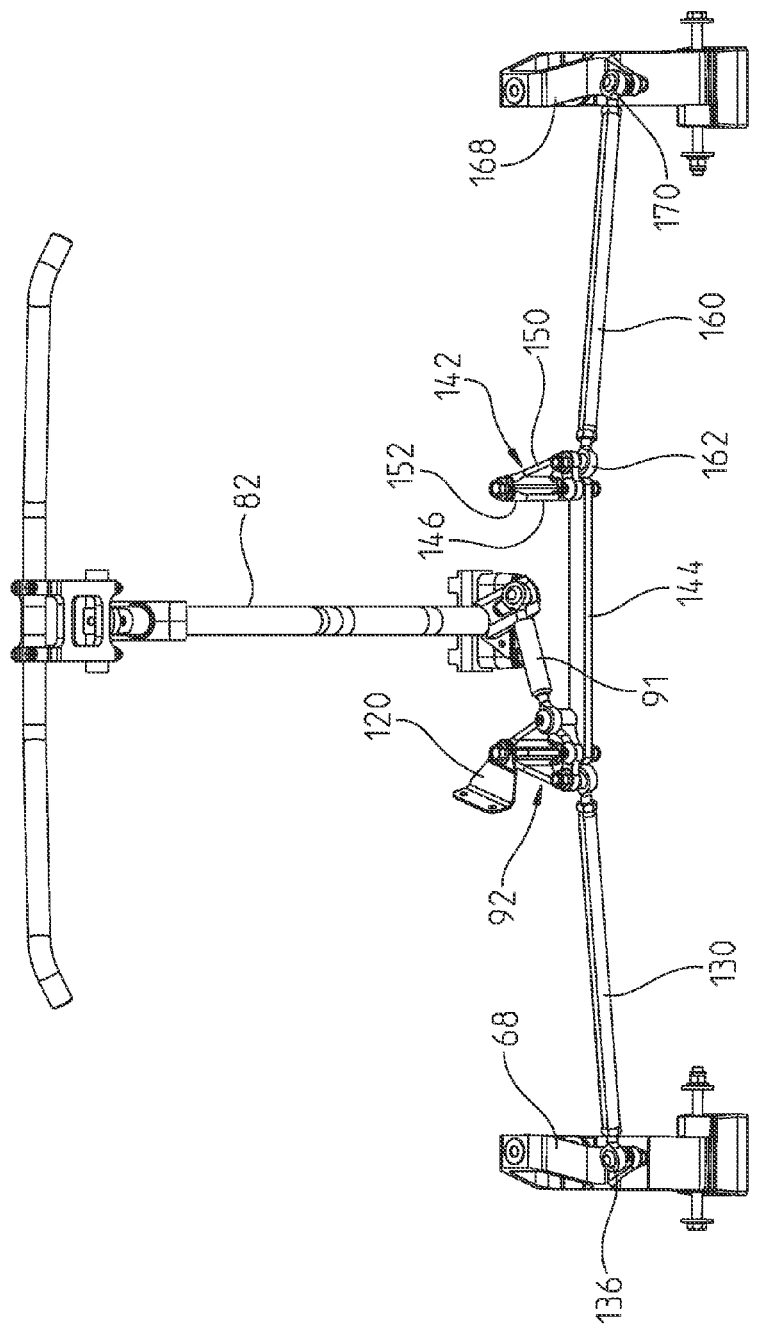
FIG. 5 is a view similar to that of FIG. 4 showing the suspension system removed.
Figure 6:
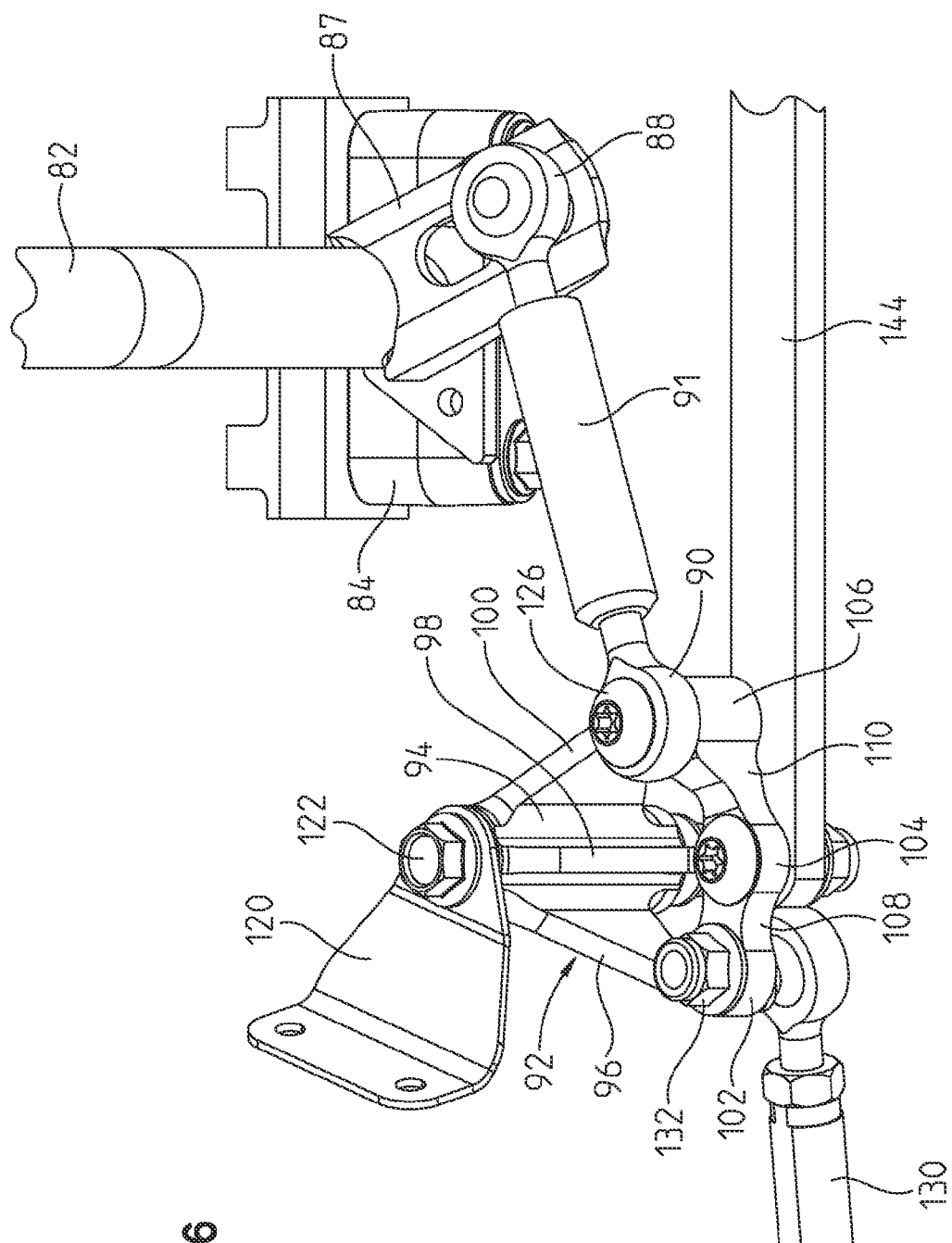
FIG. 6 is an enlarged view of the steering coupler.

With reference now to FIGS. 4-6, steering system 12 will be described in greater detail. As shown, steering system 12 includes handlebars 80 attached to a steering post 82 which is rotatably fixed at a lower end thereof and rotates relative to a mounting block 84. As shown, steering post 82 defines single post, center pivot steering, which extends over the engine 10 as shown best in FIG. 3. As shown in FIG. 1, steering post 82 includes an outward bend at 83 for clearance of engine 10. Mounting block 84 is attached to a front inner surface of the cast members 20, 22 by way of fasteners at 86 (FIGS. 2 and 4). Steering post 82 includes a pitman arm 87 having a ball joint 88 attached thereto. Ball joint 88 is coupled to a ball joint 90 by way of a link 91. Ball joint 90 is attached to a coupling link 92 having four pivot points.

As best shown in FIG. 6, coupling link 92 is a top extruded member having a pivot cylinder 94 with three radially extending webs or walls 96, 98 and 100 extending integrally from cylinder 94, and terminating in respective pivot bosses 102, 104 and 106. Bosses 102 and 104 are integrally connected by way of an integral link 108 whereas bosses 104 and 106 are interconnected by an integrated link 110.

With respect to FIGS. 5 and 6, coupling link 92 may be easily attached to the inside of cast member 20 by way of bracket 120 and pivotably mounted relative thereto by way of fastener 122. As also shown, ball joint 90 is attached to first boss 106 by way of fastener 126. Meanwhile, coupling link 92 is interconnected to tie rod 130 at boss 102 by way of fastener 132. Furthermore, tie rod 130 is attached to spindle by way of ball joint 136 (FIG. 5). As shown best in FIG. 5, coupling link 92 is interconnected in parallel to a second coupling link 142 by way of a drag link 144. Coupling link 142 is similar to coupling link 92, however, only includes two radial walls 146 and 150 attached to a pivot cylinder 152. In a similar manner, coupling link 142 is attached to tie rod 160 by ball joint 162, which in turn is coupled to spindle 168 by way of ball joint 170.

Figure 7:
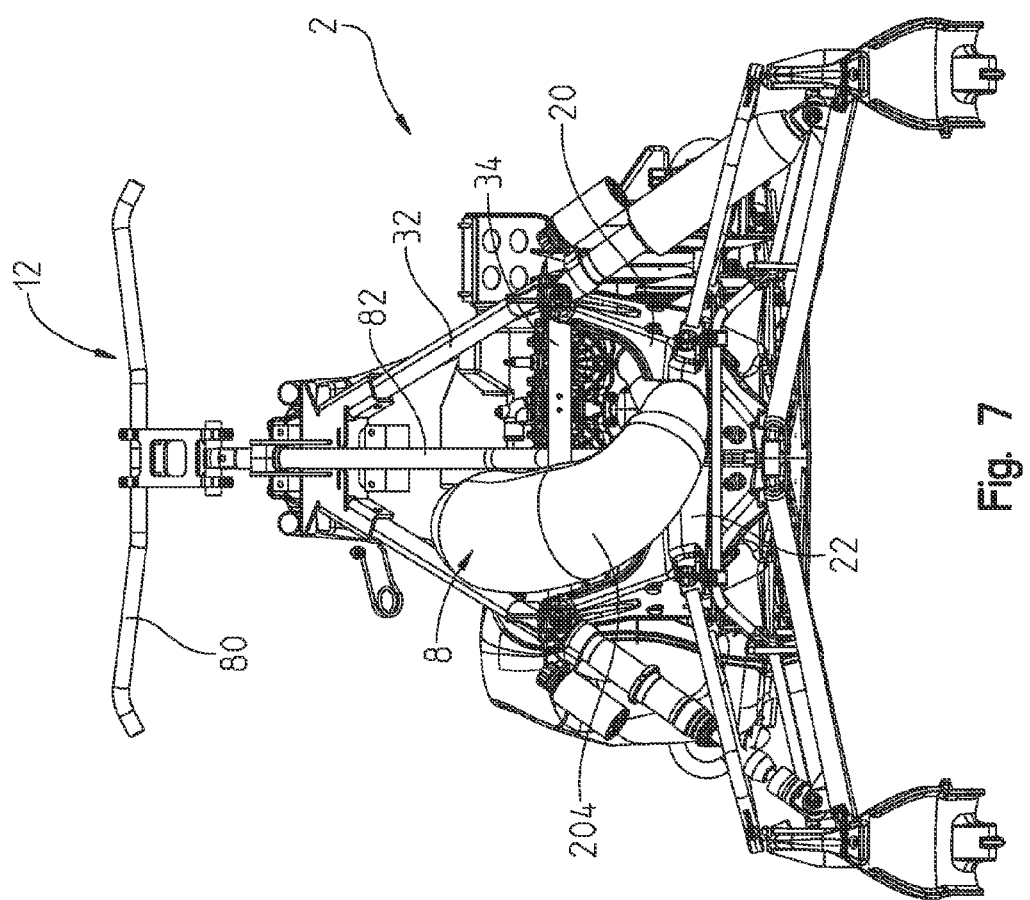
FIG. 7 is a view similar to that of FIG. 2, including the exhaust system.
Figure 8:
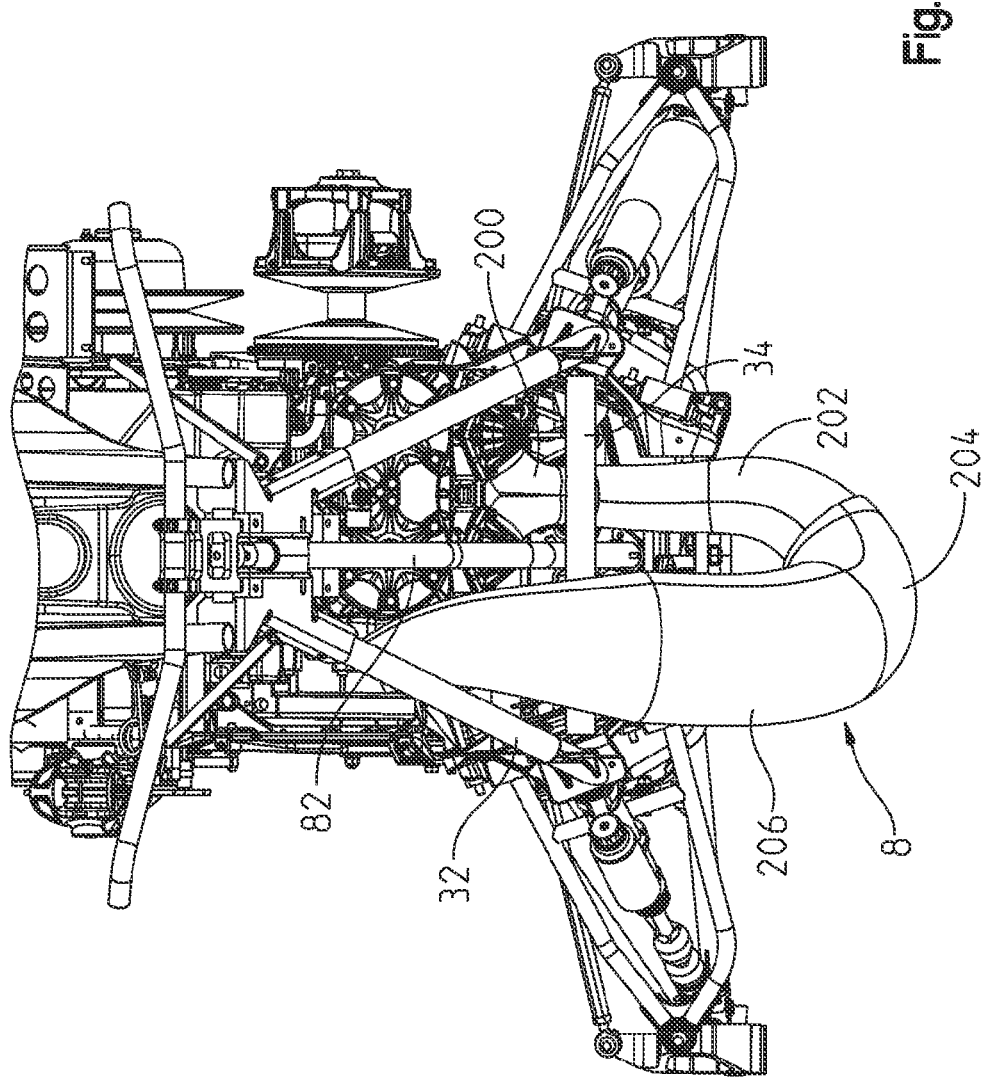
FIG. 8 is a top view of the embodiment shown in FIG. 7.
Figure 9:
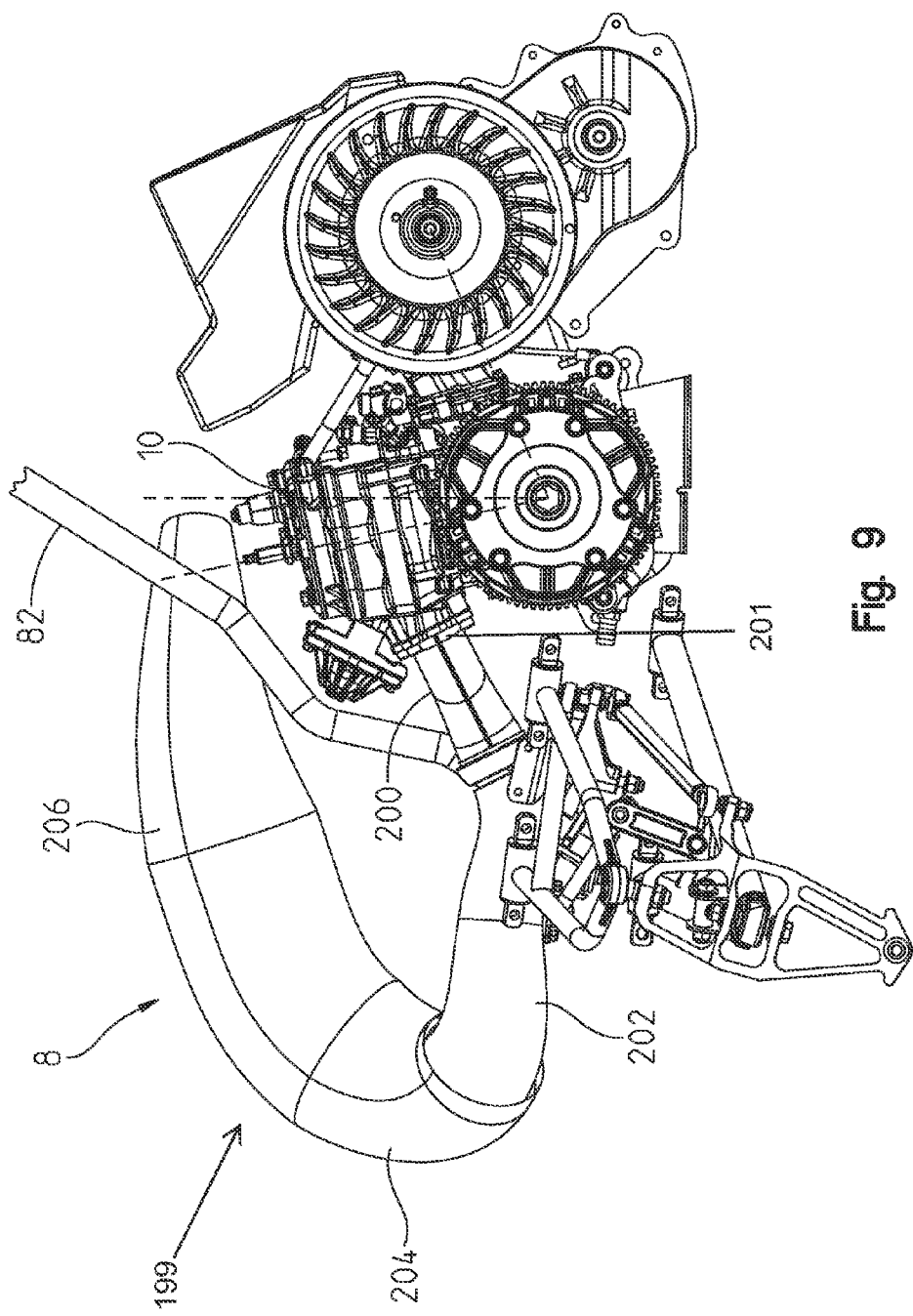
FIG. 9 is a side view of the embodiment in FIG. 8.
Figure 10:
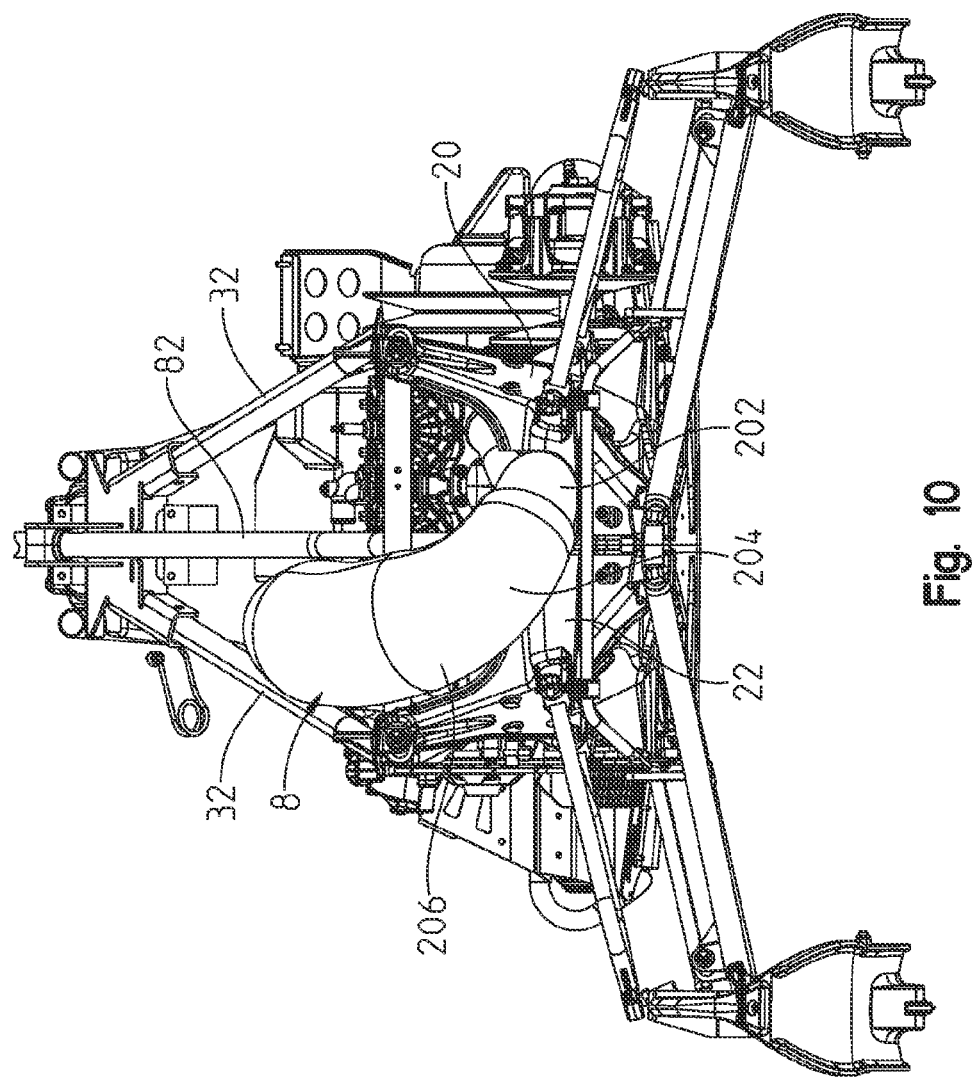
FIG. 10 is an enlarged front view of the snowmobile of FIG. 7.

With respect now to FIGS. 7-10, the exhaust system 8 will be described in greater detail. As shown, exhaust system 8 includes an exhaust manifold 200 extending forwardly and downwardly from engine 10, as best shown in FIGS. 8 and 9. Exhaust system 8 includes a first tube portion 202 extending generally longitudinally and forwardly past cast members 20, 22 and extending under cross tube 34 (FIGS. 7 and 8). As shown in FIG. 8, tube portion 202 extends on the vehicle left hand side of steering post 82. Exhaust system 8 further includes a vertically projecting radiused section 204 which turns the exhaust system 8 vertically upwardly and includes a reversely bent tube section 206 (FIG. 8) which extends generally longitudinally and rearwardly and extends on the opposite and vehicle right hand side of steering post 82. Tube portion 206 also extends above cross tube 34 and on the inside of frame tube 32. Thus the exhaust system 8 at the front of the snowmobile 2 is defined between the envelope of frame tubes 32 on either side.

Figure 11:
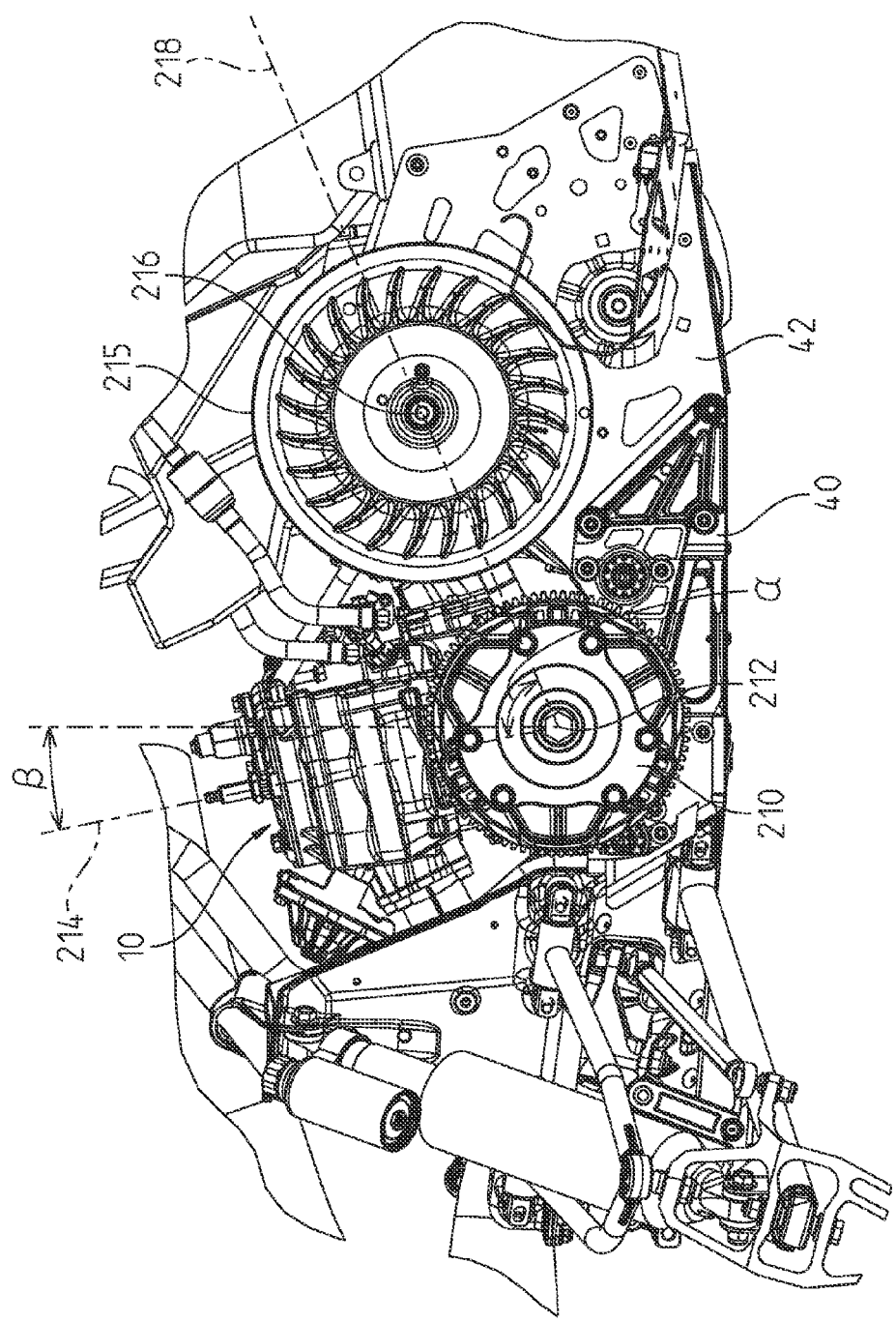
FIG. 11 is a side view of the engine and CVT configuration.

With respect now to FIG. 11, engine 10 is shown mounted in engine cradle 40 and tipped forward. As shown, a CVT (continuous variable transmission) drive clutch 210 is mounted coaxially with a crank shaft rotational axis 212. As shown, axis 212 is transverse to a longitudinal direction of snowmobile 2. As shown, engine 10 is a reciprocating type engine having a piston (not shown) reciprocating within an engine head of engine 10. Engine 10 includes a piston reciprocation axis 214 where axis 214 is rotated forward relative to vertical by an angle β. As shown, 11 equals 12°. As also shown, a CVT driven clutch 215 is mounted to drive housing 42 along a rotational axis 216. As is known in the art, a CVT belt (not shown) would entrain the drive clutch 210 and the driven clutch 215 to transmit power between the engine 10 and the driven clutch 215. A line drawn between axis 212 and axis 216 is known as the belt center axis, and is shown at 218. As an angle α is defined between lines 214 and 218 where a is in the range of approximately 70-100°. As shown, a equals 78°. This prevents any reciprocation vibration from being transmitted to the driven clutch 215.

Figure 12:
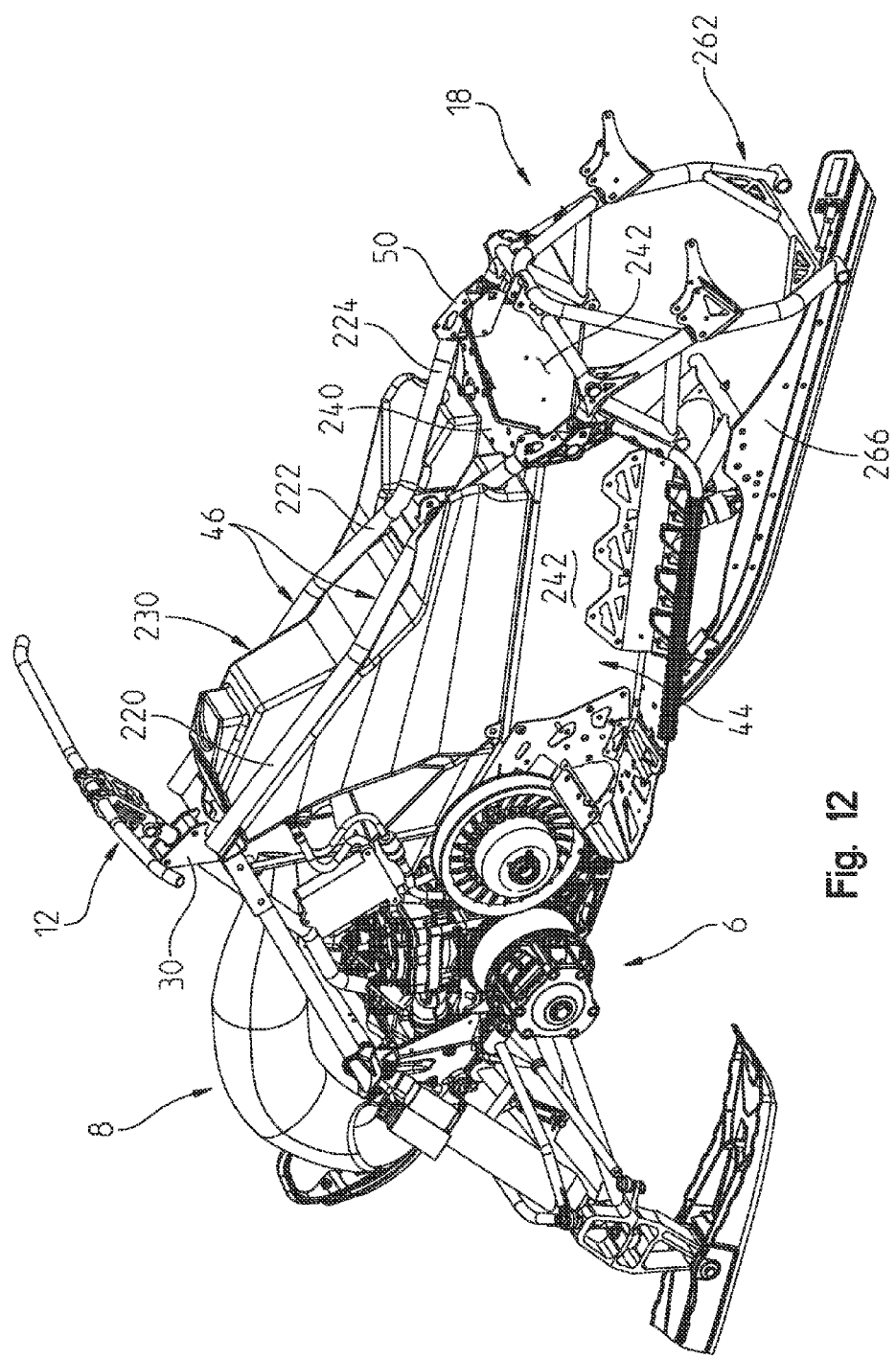
FIG. 12 shows a rear perspective view of the snowmobile of FIG. 1.
Figure 13:
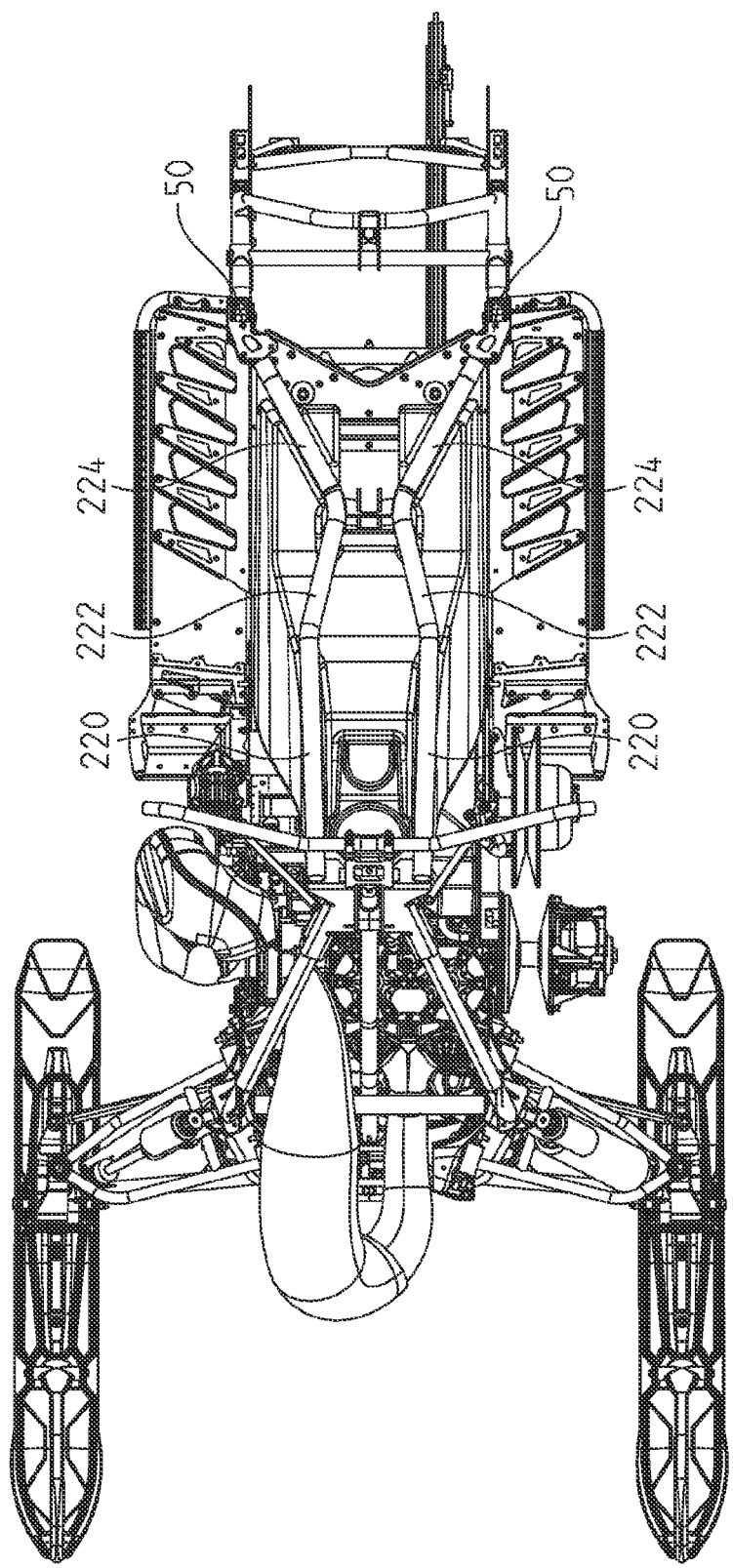
FIG. 13 shows a top view of the snowmobile of FIG. 12.
Figure 14:
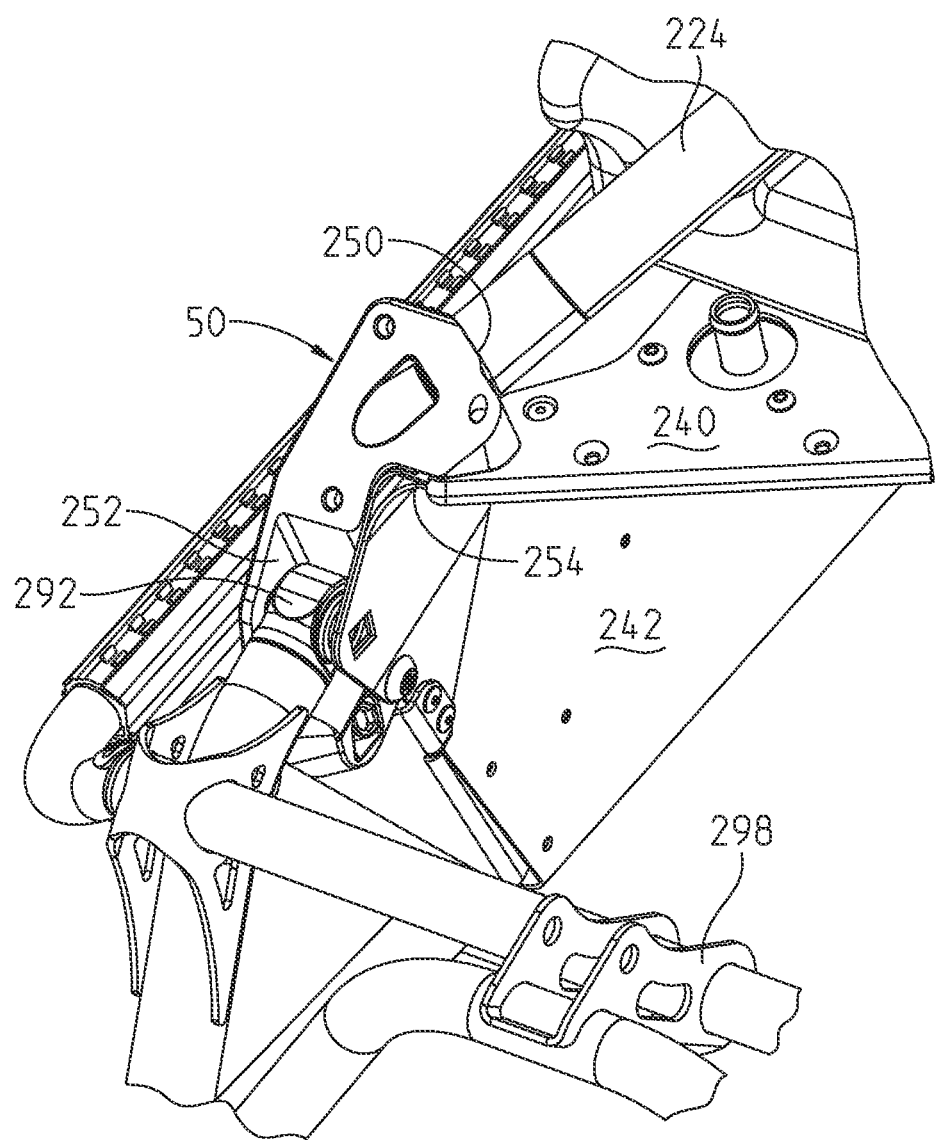
FIG. 14 shows an enlarged view of the tunnel couplings.

With reference now to FIGS. 12-14, the frame 4 will be further described. Frame tubes 46 include longitudinally extending sections 220, inwardly directed sections 222 and outwardly directed sections 224. Frame tubes 46 flank fuel tank 230 as described further herein. As also shown, tunnel 44 includes a top wall 240 and side walls 242 defining an internal enclosure for receiving the snowmobile track as is known in the art. Couplings 50 are mounted at the rear corners of tunnel 44 at the juncture of the top wall 240 and side walls 242. As shown best in FIG. 14, couplings 50 include apertures 250 receiving frame tube portions 224, a trunnion portion 252, and a mounting portion 254.

With reference now to FIGS. 15-19, rear suspension 18 will be described in greater detail. It should be appreciated that rear suspension 18 is similar to that described in U.S. patent application Ser. Nos. 11/623,879 and 12/627,642, the subject matter of which are incorporated herein by reference.

As shown, rear suspension 18 includes a front control arm 260, rear control arm 262, toggle link 264 and a pair (only one of which is shown) of slide rails 266. As shown best in FIGS. 17 and 18, front control arm 260 includes upper couplers 270 coupled to an inner surface of tunnel sidewall 242, arm portions 272 and a coupling tube 274. Coupling tube 274 is interconnected to inside surfaces of slide rail 266 as shown best in FIG. 15.

Figure 15:
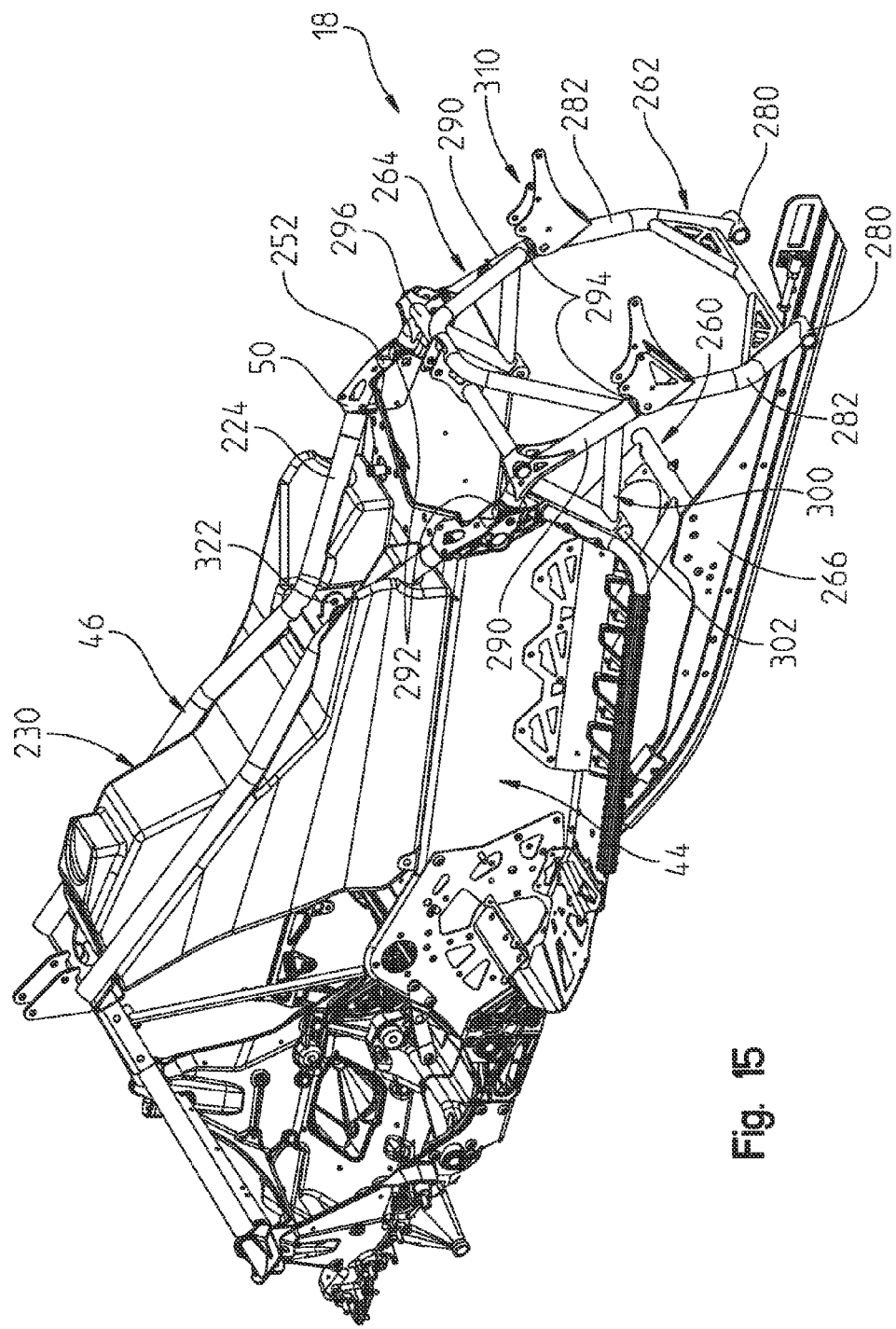
FIG. 15 shows a view similar to that of FIG. 12 less the drive mechanism.
Figure 16:
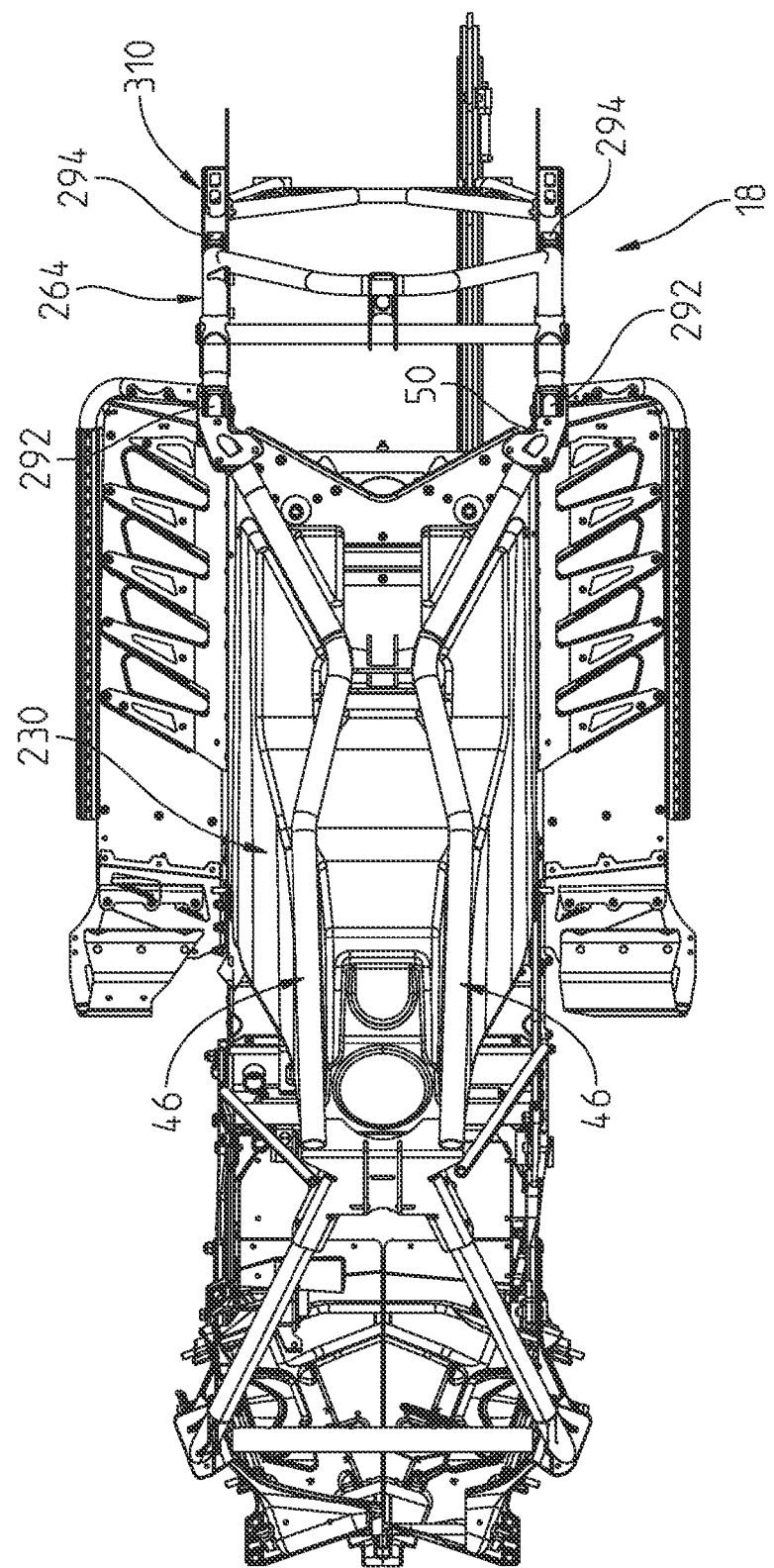
FIG. 16 shows a top view of the snowmobile frame of FIG. 15.
Figure 17:
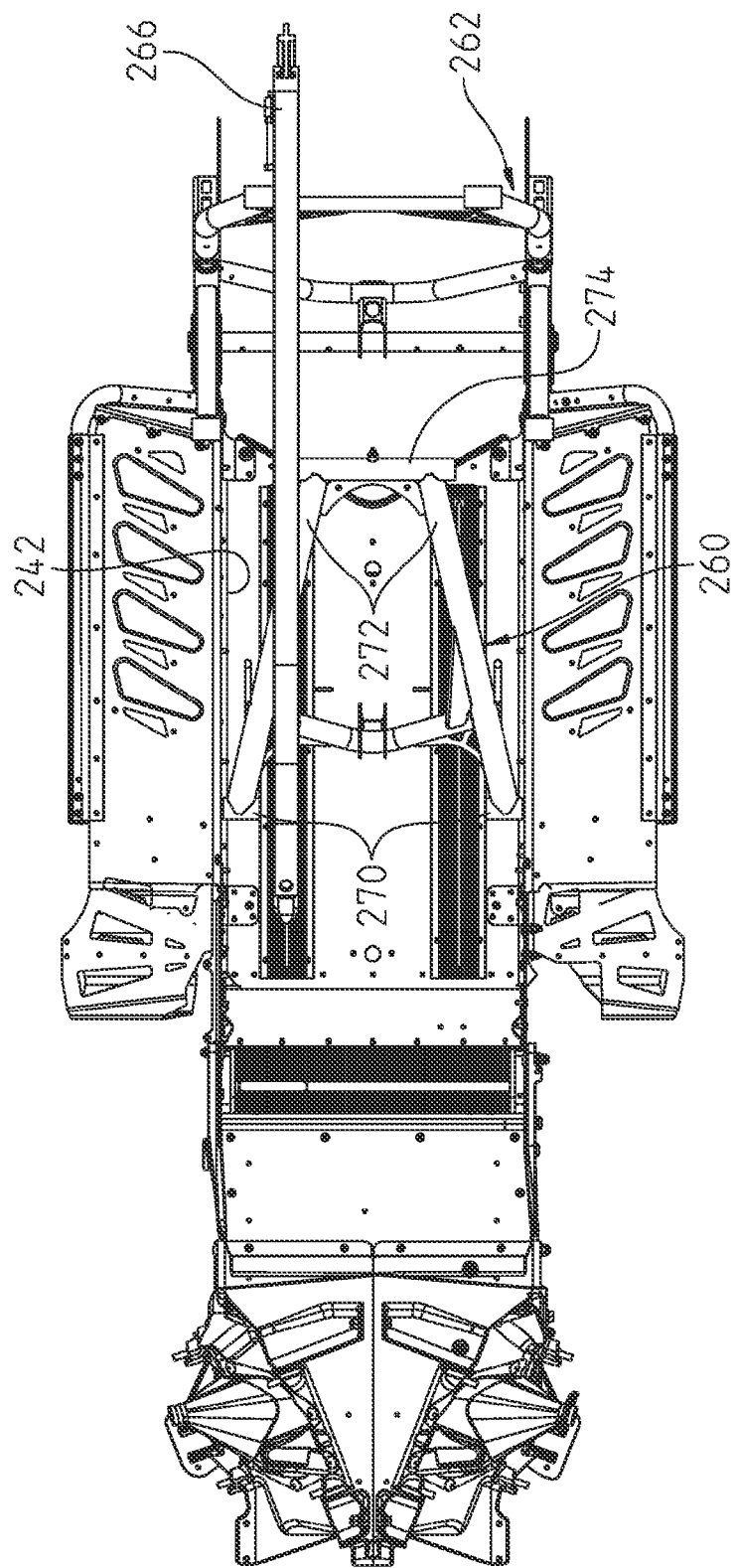
FIG. 17 shows a bottom view of the snowmobile of FIG. 16.
Figure 18:
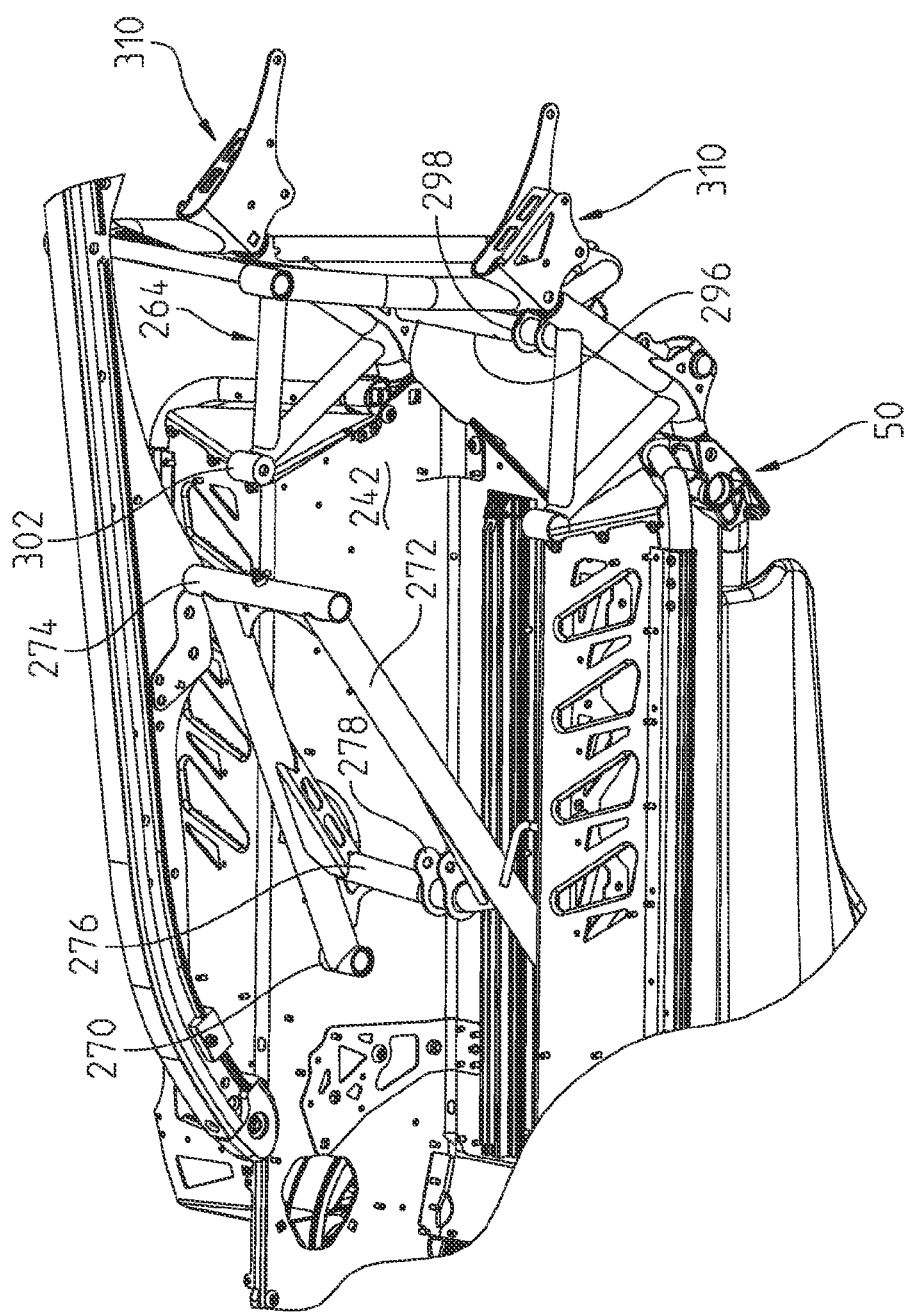
FIG. 18 shows an underside perspective view of the rear suspension.

As shown best in FIG. 15, rear control arm 262 includes couplers 280 coupled to slide rail 266 and arms 282 coupled to toggle link 264. Toggle link 264 is generally comprised of arms 290 including front couplers 292 pivotally mounted within trunnion portions 252 of couplers 50. Toggle link 264 further includes rear coupling portions 294 which couple to an upper portion of arms 282. A cross bar 296 locates a shock mount 298 (FIG. 19) as described herein. Arms 290 include triangular link portions 300 including couplers 302 for carrying a carrier roller (not shown) which is similar in design to that shown in U.S. patent application Ser. No. 12/627,642, the subject matter of which is incorporated herein by reference. Brackets 310 (FIG. 18) may also be provided to hold a rear heat exchanger as shown in U.S. patent application Ser. No. 13/018,824, the subject matter of which is incorporated herein by reference.

Figure 19:
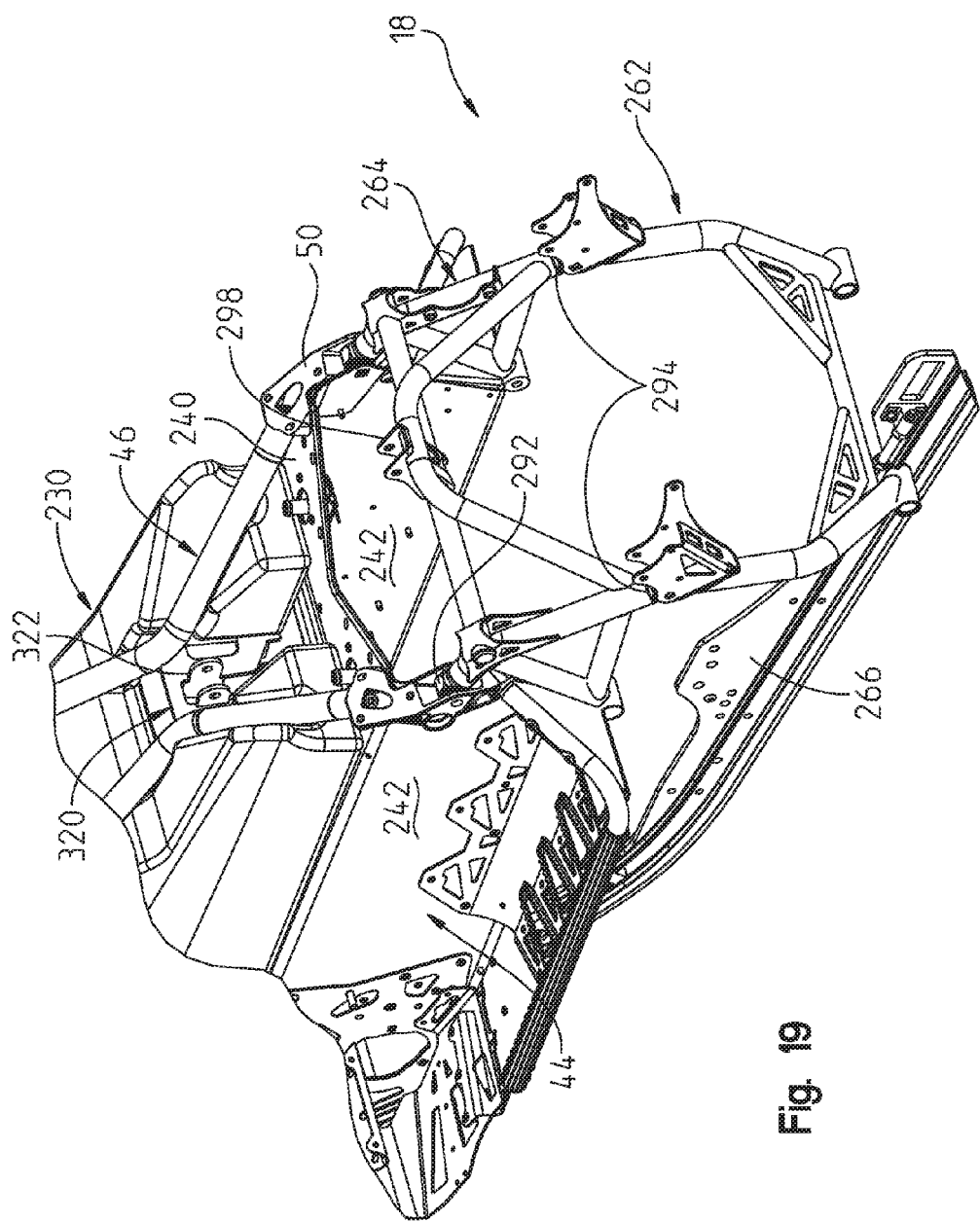
FIG. 19 shows a rear perspective view of the rear suspension.

Finally, a bracket 320 (FIG. 19) is attached to top surface 240 of tunnel 44 where a shock absorber is mounted between shock mounts 298 and 322. Thus with reference to FIG. 15, slide rails 266 move upwardly and downwardly relative to tunnel 44 by way of rear suspension 18. More particularly, as slide rail 266 moves relative to tunnel 44 (or tunnel 44 moves relative to slide rail 266), slide rails 266 move by way of front control arms 260 which are interconnected between tunnel 44 and slide rails 266. Moreover, as slide rails 266 move relative to tunnel 44, toggle link 264 is moved about couplings 292 towards and away from tunnel 44 under compression from a shock absorber mounted between shock mounts 298 and 322 (FIG. 19).

Figure 20:
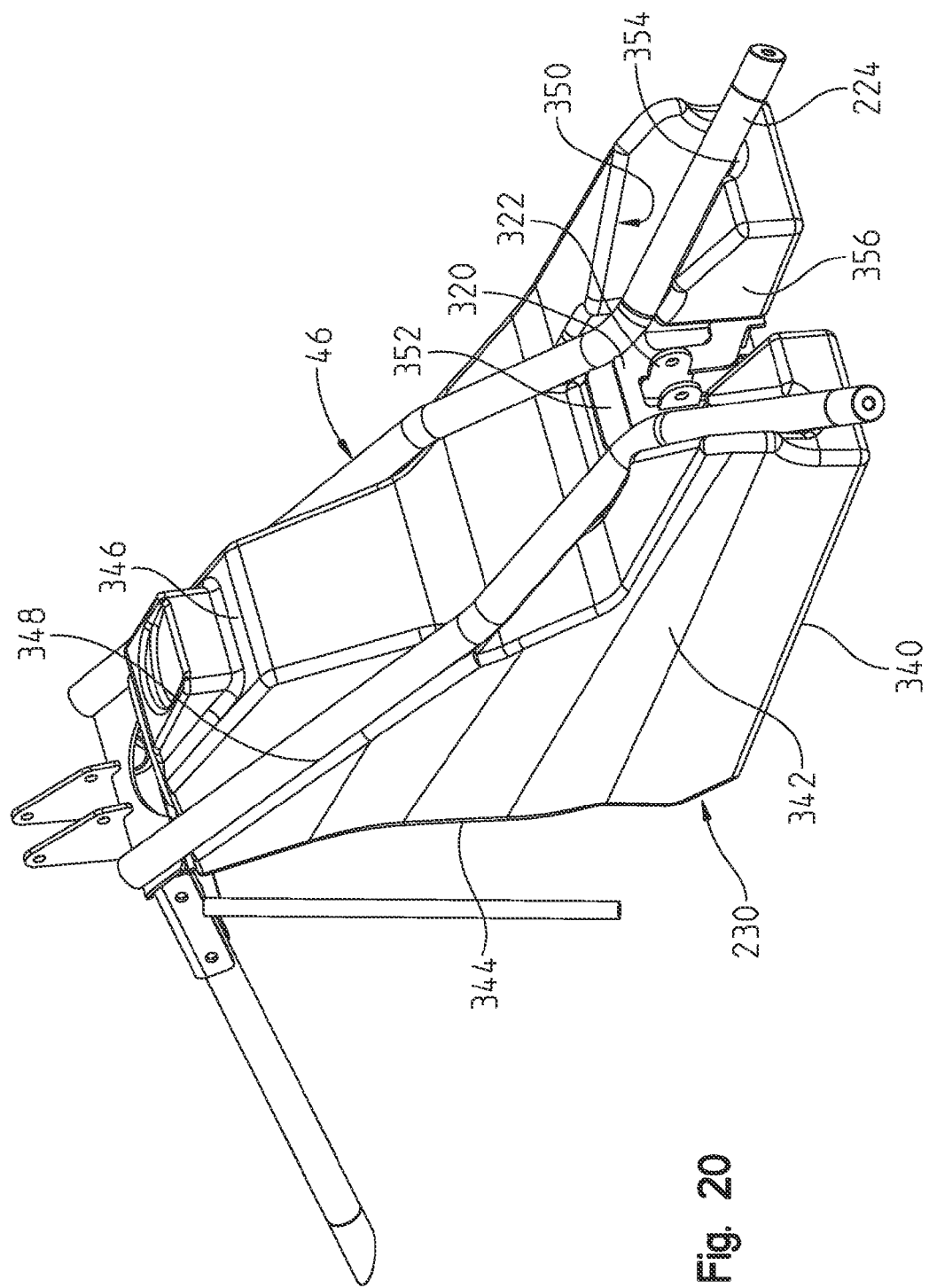
FIG. 20 shows a rear perspective view of the snowmobile fuel tank.

With reference now to FIG. 20, fuel tank 230 is shown in great detail. Fuel tank 230 is shown having a base portion 340 which conforms to the top surface 240 of tunnel 44, side walls 342, front wall 344, and a center narrow portion 346 defining shoulders 348 for receiving frame tubes 46. Fuel tank 230 further includes a rear opening 350 including a rear wall 352 to receive shock mounting bracket 320, shoulders 354 for receiving tube portions 224 and a rear opening 356 to receive shock absorber connected to shock mount 322.

With the rear suspension 18 described as mentioned above, the position of the operator and the operation of rear suspension 18 will now be described. With reference to FIG. 1, front ski 14 is attached to spindle 68 at position 400 which extends along a transverse axis 402. The present embodiment differs from the embodiments shown in U.S. patent application Ser. Nos. 11/623,879 and 12/627,642. First, the embodiment differs in that the operator has been positioned closer to the vehicle center of gravity from the previous embodiment, such that the rider is positioned substantially at the vehicle center of gravity, including the fuel and driver ($CG_{f\text{-}d}$). It should also be noted that the $CG_{f\text{-}d}$ may be changed plus or minus 2 inches based on the rider and the respective position on the snowmobile 2. Secondly, the front control arm 260 of the rear suspension assembly 18 has been moved rearwardly, which has modified the pitch of the vehicle. Finally, the tunnel 44 of the present embodiment has been elongated, which has provided several inherent improvements.

With reference to FIG. 3, a longitudinal position from ski bolt position 400 to a position of operator's hands on hand grip 404 is shown at $X_1$, where $X_1$ is in a range of 750-770 mm, and in the embodiment shown $X_1$ equals 29.93 inches (760.24 mm). This is approximately 2.5-4.0 inches forward of the position of the embodiments shown in U.S. patent application Ser. Nos. 11/623,879 and 12/627,642. In a similar manner, the position of the operator's hands on hand grip 404 is forward of a belt drive axis 406 by a distance of $X_2$, where $X_2$ is in a range of 100-120 mm, and in the embodiment shown $X_2$ equals 4.385 inches (111.39 mm). Snowmobile 2 also includes an operator's foot rest 408, and a forward most position of foot rest 408 is forward of drive axis 406 by a dimension of $X_3$, where $X_3$ is in a range of 30-50 mm, and in the embodiment shown $X_3$ equals 1.54 inches (39.1 mm). As also shown in FIG. 3, the center of gravity of the vehicle dry with the suspension in the fully extended position ($CG_d$) is shown at 410 which is rearward of drive axis 406 by a dimension of $X_4$, where $X_4$ is in a range of 65-75 mm, and in the embodiment shown equals 2.699 inches (68.57 mm).

Position 412 in FIG. 3 represents the pivot axis of front control arm 260 and in particular the position for connection of couplings 270 (FIG. 17) inside the tunnel 44. This is approximately 5.5 inches rearward of the position shown in the embodiments shown in U.S. patent application Ser. Nos. 11/623,879 and 12/627,642. The longitudinal distance for pivot point 412 is positioned a distance of $X_5$ from drive axis 406, where $X_5$ is in a range of 210-260 mm, and in the embodiment shown equals 236.33 mm. Position 414 shows a seating position for operator on snowmobile 2. The seating position is rearward of drive axis 406 by a dimension of $X_6$, where $X_6$ is in a range of 405-505 mm, and in the embodiment shown equals 18.00 inches (457.20 mm). Thus the positions 404, 408 and 414 define the operator coordinates relative to the $CG_d$. Furthermore, the pivot point 360 for toggle link 264 (FIG. 15) is at the center of coupler 292. The distance between the drive axis 406 and pivot point 360 is $X_7$, where $X_7$ is in a range of 700-800 mm, and in the embodiment shown equals 29.766 inches (756.055 mm). As also shown in FIG. 3, a distance from the ski bolt position 400 and spindle pivot axis 402 to the front control arm mounting 412 is in the range of 1000-1200, and is approximately 1100 mm. In the embodiment distance from the ski bolt position 400 to the front control arm mounting 412 is 1107.96 mm ($X_1+X_2+X_5$).

As also shown in FIG. 3, the vertical position of pivot point 412 is $Y_1$ from a ground position and the vertical position of $CG_d$ 410 is in a range of 320-360 mm, and in the embodiment shown is equal to 345.10 mm or an incremental $Y_2$, where $Y_2$ equals 92.22 mm.

In this position, the pivot point 412 of front control arm 260 is rearward of the $CG_d$, whereas in the version shown in U.S. patent application Ser. Nos. 11/623,879 and 12/627,642, the pivot point of front control arm 260 is forward of the $CG_d$. Thus, the positioning of the front control arm 260, and particularly the mounting of couplers 270, can vary the amount of the vehicle pitch. The steeper the angle of control arm 260, the greater the vehicle pitches; whereas the flatter the angle of control arm 260, the lesser the vehicle pitches. This is due to the vertical force component of front control arm 260 acting on and through the coupler 270.

With reference still to FIG. 3, the pivot point for toggle link 264 is at coupler 292, which is 54.6 mm further back from the position shown in U.S. patent application Ser. Nos. 11/623,879 and 12/627,642. This improves carrier wheel engagement, improves transfer control, reduces sensitivity, increases running-board length, provides room for fuel capacity and provides a more rearward position for the shock mounting.

Figure 21:
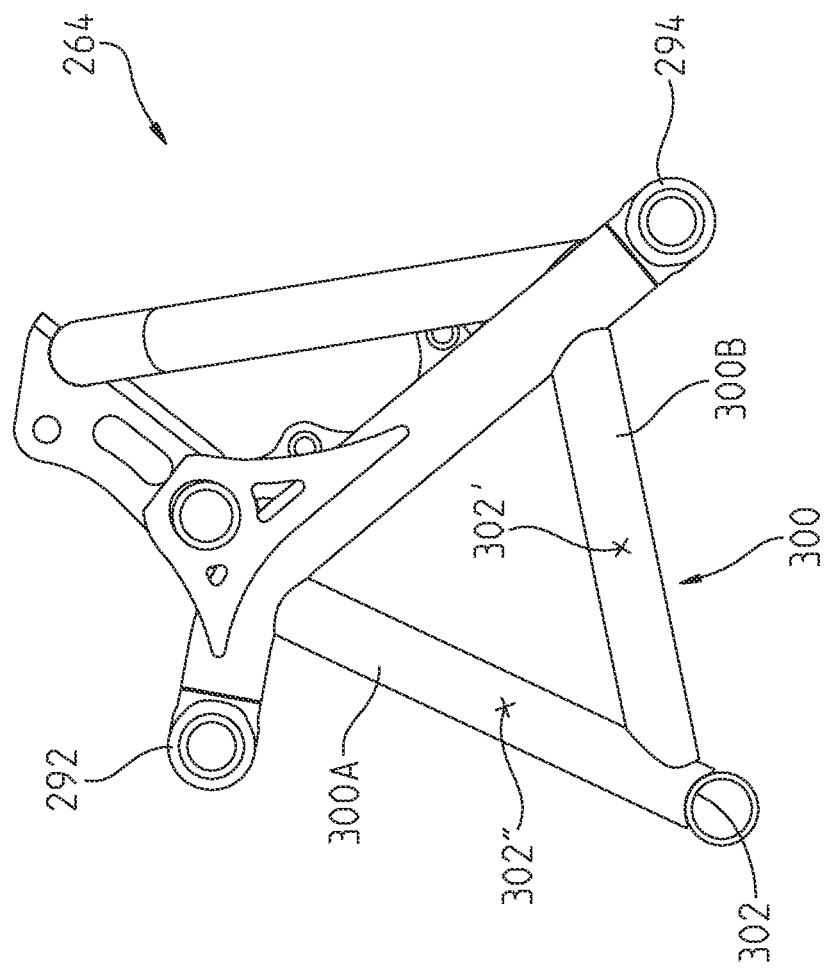
FIG. 21 shows a side view of the toggle link.

With reference now to FIG. 21, toggle link 264 is shown in side view. As mentioned above, toggle link 264 rotates relative to tunnel 44 via pivot couplings 292 and rotates relative to rear control arm 262 by way of pivot coupling 294. As shown in the FIG. 21 embodiment, legs 300A, 300B, which make up link 300, are substantially the same length. A carrier roller (not shown) is rotatably mounted to coupling 302. As toggle link 264 is rotatably coupled to tunnel 44 at pivot point 292, during compression of rear suspension 18, toggle link 264 rotates counterclockwise. As toggle link 264 rotates, a carrier roller attached at 302 has some slight vertical downward movement before it swings vertically upward. However, the carrier roller may be moved to other positions relative to the toggle link 264 to change the position of the carrier roller, and resultantly, can the dynamic attributes of the snowmobile 2, as discussed below.

For example, and with reference to FIG. 21, a carrier roller mounted further rearward along arm 300B (for example to a point 302'), would have immediately upward movement upon counter clockwise rotation of toggle link 264 and would provide more aggressive propulsion of the drive belt. This is due to the increase in bias of the carrier roller, which upon acceleration of snowmobile 2, causes more load to go down to the rear control arm 262, then to the slide rail 266 and into the ground. Conversely, if a carrier roller were moved upward to a position 302" along arm 300A, upon acceleration, the chassis is pulled down resulting in more vertical lift of the snowmobile during acceleration. It should also be noted that movement rearward, for example to position 302' also increases the cornering ability of the snowmobile 2.

Figure 22:
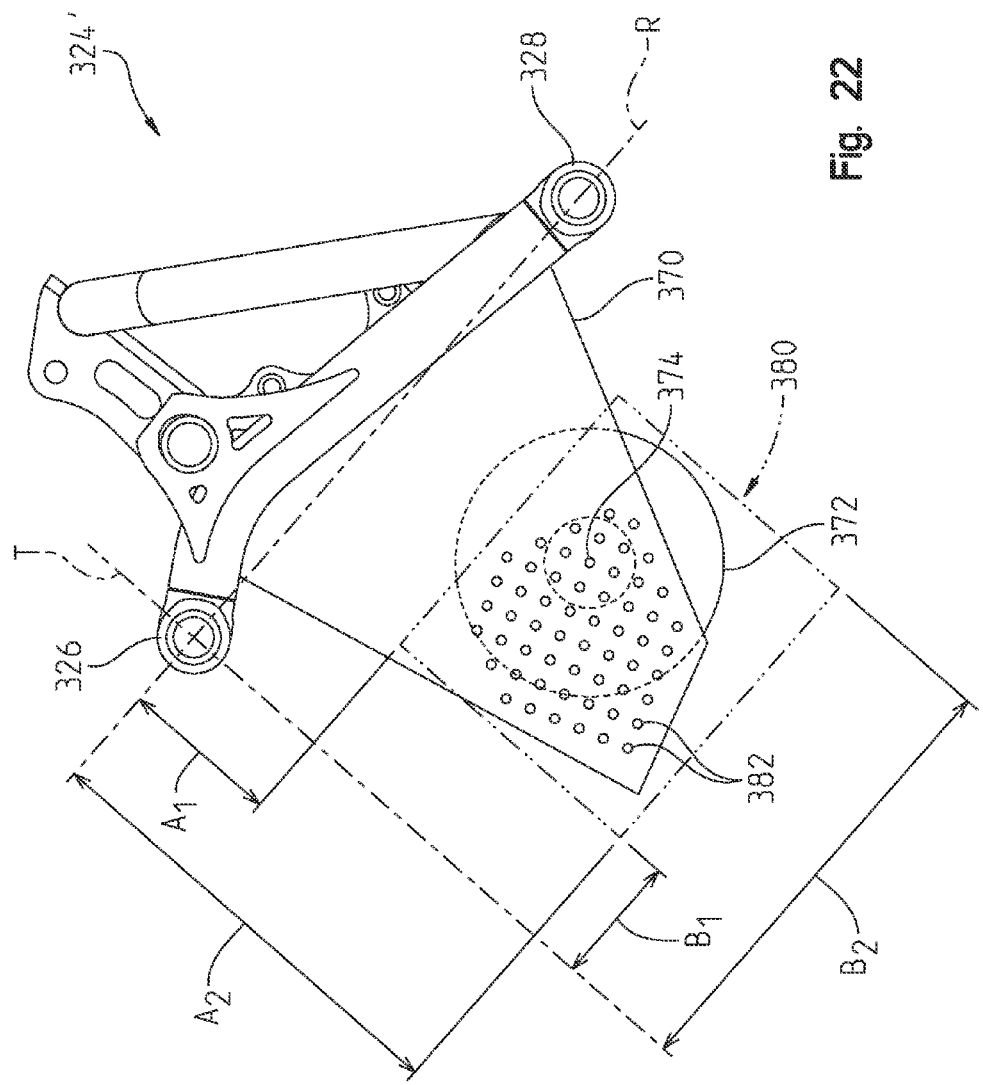
FIG. 22 shows an alternative embodiment of the toggle link.

Thus, and with reference to FIG. 22, a toggle link 324' could be provided having front and rear pivot points 326 and 328. Arms 300A and 300B of the FIG. 21 embodiment are replaced by a trapezoidal plate 370 with a roller 372 mounted thereto. Roller 372 is mounted about a center of rotation 374. Carrier roller 372 could be positioned within a zone defined within hypothetical box 380 where the desirability of the drive characteristics could be "tuned" by positioned roller on any one of the mounting apertures 382. Hypothetical box 380 is defined relative to a reference line R drawn through the centers of pivot points 326 and 328, and relative to a tangent line T, tangent to reference line R and through pivot point 326. With reference to FIG. 22, hypothetical box 340 is approximately positioned between $A_1$ (80 mm) and $A_2$ (225 mm) from reference line R, and $B_1$ (60 mm) and $B_2$ (225 mm) from reference line T. In the embodiment shown, hypothetical box 340 is positioned between $A_1$ (80 mm) and $A_2$ (226.68 mm) from reference line R, and $B_1$ (59.35 mm) and $B_2$ (225.23 mm).

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

The invention claimed is:

1. A snowmobile, comprising:
   a chassis, comprising a bulkhead and a tunnel;
   an engine supported by the chassis;
   a front suspension coupled to the bulkhead;
   a rear suspension coupled to the tunnel; and
   slide rails coupled to the rear suspension;
      the rear suspension comprising:
         a toggle link pivotally coupled to the tunnel at a first pivot coupling, and a rear control arm coupled between the slide rails and the toggle link, the toggle link being pivotally coupled to the rear control arm at a second pivot coupling;
         a carrier roller directly coupled to the toggle link, the carrier roller being movable to a plurality of positions relative to the toggle link to vary propulsion dynamics of the vehicle; and
         a front control arm coupled between the slide rails and the tunnel.

2. The snowmobile of claim 1, wherein the toggle link has a front and rear coupling link, and the carrier roller is mounted in a position generally lower than the front and rear coupling link.

3. The snowmobile of claim 2, wherein the carrier roller is mounted in a position generally centrally located relative to the front and rear coupling link of the toggle link.

4. The snowmobile of claim 2, wherein the carrier roller is mounted in a position generally rearwardly located relative to the front and rear coupling link of the toggle link.

5. The snowmobile of claim 2, wherein the carrier roller is mounted in a position generally forwardly located relative to the front and rear coupling link of the toggle link.

6. The snowmobile of claim 1, wherein the carrier roller is movable within a box-shaped range defined relative to the first and second pivot couplings.

7. The snowmobile of claim 6, wherein the box-shaped range is positioned below a reference line (R) which extends between the first and second pivot couplings.

8. The snowmobile of claim 7, wherein the box-shaped range is positioned between lines ($A_1$, $A_2$) below the reference line (R).

9. The snowmobile of claim 8, wherein the line $A_1$ is approximately 80 mm.

10. The snowmobile of claim 8, wherein the line $A_2$ is approximately 225 mm.

11. The snowmobile of claim 7, wherein the box-shaped range is positioned rearward of a tangent line (T) which extends through the first coupling, and is tangent to the reference line (R).

12. The snowmobile of claim 11, wherein the box-shaped range is positioned between lines ($B_1$, $B_2$) rearward of the tangent line (T).

13. The snowmobile of claim 12, wherein the line $B_1$ is approximately 60 mm.

14. The snowmobile of claim 12, wherein the line $B_2$ is approximately 225 mm.

15. The snowmobile of claim 1, wherein the carrier roller is positioned 99-320 mm below the first pivot coupling.

16. The snowmobile of claim 1, wherein a rotational axis of the carrier roller is positioned away from the first pivot coupling by a distance along a reference line R, and a length of the toggle link between the first pivot coupling and the second pivot coupling equals D, and wherein a ratio of R/D is within a range of 0.34 to 1.097.

17. The snowmobile of claim 1, further comprising an endless track operably coupled to at least a portion of the slide rails and the carrier roller is positioned interior of the endless track.

18. The snowmobile of claim 1, wherein the toggle link includes a plate and the carrier roller is coupled to the plate.

19. The snowmobile of claim 18, wherein the plate includes a plurality of holes and a center of rotation of the carrier roller is aligned with at least one of the holes.

20. The snowmobile of claim 18, wherein the toggle link has a front coupling link and a rear coupling link, and the plate is positioned between the front and rear coupling links.

21. The snowmobile of claim 18, wherein the carrier roller is directly coupled to the plate.

* * * * *